United States Patent
Kim et al.

(10) Patent No.: US 7,304,693 B2
(45) Date of Patent: Dec. 4, 2007

(54) LIQUID CRYSTAL DISPLAY APPARATUS HAVING PARTICULAR FIXING GROOVES AND FIXING PROTUBERANCES IN REAR CASE

(75) Inventors: Dong-Cheol Kim, Suwon-si (KR); Young-Bee Chu, Suwon-si (KR); Tae-Gil Kang, Suwon-si (KR); Young-Jae Lee, Seongnam-si (KR); Jung-Ki Kim, Seoul (KR); Jae-Chang Choi, Yongin-si (KR); Jeong-Seok Oh, Seoul (KR); Yong-Seok Kwak, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/519,626

(22) Filed: Sep. 12, 2006

(65) Prior Publication Data

US 2007/0008452 A1 Jan. 11, 2007

Related U.S. Application Data

(60) Continuation of application No. 11/103,720, filed on Apr. 12, 2005, now Pat. No. 7,126,651, which is a division of application No. 10/114,639, filed on Apr. 2, 2002, now Pat. No. 6,919,937.

(30) Foreign Application Priority Data

Sep. 27, 2001 (KR) ................ 2001-60156

(51) Int. Cl.
*G02F 1/1333* (2006.01)
*G02F 1/1335* (2006.01)

(52) U.S. Cl. .................. 349/58; 349/65; 349/61
(58) Field of Classification Search ............ 349/58, 349/61, 65, 56; 361/600, 681, 67; 174/50
See application file for complete search history.

(56) References Cited

U.S. PATENT DOCUMENTS 5,838,400 A 11/1998 Ueda et al. .......... 349/58

(Continued)

FOREIGN PATENT DOCUMENTS

JP 11219134 8/1999

OTHER PUBLICATIONS

Korea Office Action; 9-5-2007-047835651; Aug. 31, 2007. All references cited in the foreign Office action are listed above.

*Primary Examiner*—Mike Qi
(74) *Attorney, Agent, or Firm*—Cantor Colburn LLP

(57) ABSTRACT

Disclosed is a liquid crystal display apparatus in which a liquid crystal display module and cases are tightly combined. At least one protuberance formed on a top chassis of the liquid crystal display module combines at least one fixing portion formed on a portion of a rear case corresponding to the at least one protuberance. Also, a fixing protuberance formed on a portion of a front case is inserted into between the liquid crystal display module and the rear case, thereby preventing the liquid crystal display module from being moved. Therefore, the liquid crystal display module and the cases are tightly combined, and productivity of the liquid crystal display apparatus can increase by reducing the number of parts demanded for fabrication of the liquid crystal display module and the cases.

11 Claims, 34 Drawing Sheets

U.S. PATENT DOCUMENTS

| | | |
|---|---|---|
| 6,166,788 A | 12/2000 | Ha et al. ............... 349/58 |
| 6,339,457 B1 | 1/2002 | Won ..................... 349/58 |
| 6,339,530 B1 | 1/2002 | Uchiyama et al. ..... 361/681 |
| 6,626,550 B2 | 9/2003 | Choi ..................... 362/31 |
| 2001/0003471 A1 | 6/2001 | Lee et al. ............... 349/58 |
| 2001/0036057 A1* | 11/2001 | Fukuyoshi ............. 361/681 |
| 2001/0038523 A1 | 11/2001 | Bang ..................... 361/681 |

* cited by examiner

LIQUID CRYSTAL DISPLAY APPARATUS HAVING PARTICULAR FIXING GROOVES AND FIXING PROTUBERANCES IN REAR CASE

CROSS REFERENCE TO RELATED APPLICATIONS

This application is a continuation of U.S. patent application No. 11/103,720, filed on Apr. 12, 2005, now U.S. Pat. No. 7,126,651, which is a divisional application of U.S. patent application No. 10/114,639, filed on Apr. 2, 2002, now U.S. Pat. No. 6,919,937, which claims priority to Korean Application No. 2001-60156, the disclosure of which are herein incorporated by reference in their entirety.

BACKGROUND OF THE INVENTION

1. Field of the Invention

The present invention relates to a liquid crystal display apparatus, and more particularly to a liquid crystal display apparatus in which a liquid crystal display module is tightly combined with cases, which is available for a notebook computer.

2. Description of the Related Art

Recently, information processors have been rapidly developed in a trend with various architectures, functions and faster information processing speed. Such information processors need display devices such as a liquid crystal display apparatus for displaying processed information to a user.

When a voltage is applied to a liquid crystal cell, a molecular arrangement of the liquid crystal is changed. The liquid crystal display device converts variations in optical characteristics such as a birefringence, a rotatory polarization, a dichroism and a light scattering according to the molecular arrangements of the liquid crystal into variations in visual characteristics, thereby displaying an image.

A size of the liquid crystal display apparatus gradually increases according to a demand of the user, and a liquid crystal display module and cases for receiving the liquid crystal display module also have dimensions that gradually increase in response to the size of the liquid crystal display apparatus. Thus, research concerning not only an assembled structure between the liquid crystal display module and cases but also a layout for parts of the liquid crystal display apparatus is performed so as to meet an augmentation of the dimension of the liquid crystal display apparatus and reductions of a weight, a size and a thickness of the liquid crystal display apparatus in these days.

In particular, a combining space according to a combination of the liquid crystal display module and cases becomes more important as for an installation structure between the liquid crystal display module and cases.

FIG. 1 is an exploded perspective view schematically showing a conventional liquid crystal display apparatus.

Referring to FIG. 1, a liquid crystal display apparatus 60 has a liquid crystal display module 30, for displaying an image, and cases including a front case (not shown) and a rear case 40 in order to receive the liquid crystal display module 30.

The liquid crystal display module 30 includes a display unit for displaying the image, a back light assembly for supplying a light to the display unit, a mold frame for receiving the display unit and the back light assembly, and a top chassis combining with the mold frame to fix the display unit and the back light assembly to the mold frame. When the back light assembly and the display unit are successively received in the mold frame, the top chassis combines with the mold frame.

A top installation method is utilized for mounting the liquid crystal display module 30 in the rear case 40. Particularly, first, second, third, and fourth mounting portions 11, 12, 13 and 14 having predetermined heights are formed on four corners of the top chassis 10 of the liquid crystal display module 30. First, second, third and fourth screwed combining holes 11a, 12a, 13a and 14a are formed through the first, second, third and fourth mounting portions 11, 12, 13 and 14, respectively. First, second, third and fourth burrings 41, 42, 43 and 44 corresponding to the first, second, third and fourth screwed combining holes 11a, 12a, 13a and 14a are formed on four corners of the rear case 40 corresponding to the first, second, third and fourth mounting portions 11, 12, 13 and 14.

When the first, second, third and fourth screwed combining holes 11a, 12a, 13a and 14a of the top chassis 10 correspond to the first, second, third and fourth burrings 41, 42, 43 and 44 of the rear case 40, respectively, first, second, third and fourth screws 11b, 12b, 13b and 14b engage with the first, second, third and fourth screwed combining holes 11a, 12a, 13a and 14a and the first, second, third and fourth burrings 41, 42, 43 and 44, thereby fixing the liquid crystal display module 30 to the rear case 40.

The top installation method, however, has some disadvantages as follows.

First, the number of assembling steps for fabrication of the liquid crystal display apparatus 60 increases since the liquid crystal display module 30 is combined with the cases using the screws. Hence, productivity as well as operation efficiency decreases in fabricating the liquid crystal display apparatus 60.

Also, manufacturing costs and time for the liquid crystal display apparatus 60 increase because additional parts such as the screws are demanded for combining the liquid crystal display module 30 with those cases.

Furthermore, an overall size of the liquid crystal display apparatus 60 increases because the first, second, third and fourth mounting portions 11, 12, 13, and 14 are protruded from side walls of the top chassis toward outside.

SUMMARY OF THE INVENTION

The present invention provides a liquid crystal display apparatus in which a liquid crystal display module is tightly combined with cases.

The present invention further provides a liquid crystal display apparatus enhancing productivity by reducing the number of parts demanded for a fabrication of the liquid crystal display apparatus.

In one aspect, there is provided a liquid crystal display apparatus comprising a liquid crystal display module having at least one first protruding portion, a rear case for receiving the liquid crystal display module, wherein the rear case has at least one first fixing portion for guiding and fixing the at least one first protruding portion, and a front case combined with the rear case wherein the front case has at least one second protruding portion for fixing the liquid crystal display module.

The liquid crystal display module includes a back light assembly for generating a light, a display unit for receiving the light to display an image, a mold frame for receiving the back light assembly and the display unit, and a top chassis for fixing the display unit and the back light assembly to the mold frame by combining with the mold frame, which has a first side wall and a second side wall opposed each other wherein the at least one first protruding portion having a predetermined height is formed on the first and the second side walls, respectively.

The at least one first fixing portion is respectively formed on third and fourth side walls of the rear case corresponding to the first and second side walls of the top chassis. The at least one first fixing portion includes at least one first fixing groove extended from upper faces of the third and the fourth side walls of the rear case toward a bottom face of the rear case, and a second fixing groove extended from a lower portion of the first fixing groove toward a fifth side wall disposed between the third and the fourth side walls of the rear case.

The liquid crystal display module slides toward the second fixing groove of the rear case to be combined with the rear case when the at least one first protruding portion of the top chassis is received in the first fixing groove of the rear case.

The at least one second protruding portion is protruded from first and second upper faces of the front case corresponding to the third and the fourth side walls of the rear case, and the at least one second protruding portion is received in the at least one first fixing groove of the rear case. A bottom face of the at least one second protruding portion of the front case directly contacts a bottom face of the at least one first fixing groove of the rear case.

Also, a third protruding portion protruded toward the bottom face of the rear case is formed on a third upper face of the front case positioned on a sixth side wall of the rear case corresponding to the fifth side wall of the rear case. The third protruding portion of the front case is received in an isolation space formed between the sixth side wall of the rear case and the liquid crystal display module, and a bottom face of the third protruding portion directly contacts the bottom face of the rear case.

Also, a fourth protruding portion protruded toward the fifth side wall of the rear case is formed on a seventh side wall of the top chassis corresponding to the fifth side wall of the rear case. The at least one second fixing portion is formed on the fifth side wall of the rear case wherein the at least one second fixing portion has a third fixing groove formed from the liquid crystal display module received in the rear case toward the fifth side wall of the rear case. Hence, the liquid crystal display module is fixed as the fourth protruding portion of the top chassis is received in the third fixing groove formed on the second fixing portion of the rear case when the liquid crystal display module slides toward the fifth side wall of the rear case.

In addition, the at least one first fixing portion comprises a fourth fixing groove extended from upper faces of the third and the fourth side walls of the rear case toward the bottom face of the rear case. The at least one second protruding portion is protruded by a predetermined height from the first and second upper faces of the front case corresponding to the third and fourth side walls of the rear case. The liquid crystal display module combines the rear case by the first protruding portion of the top chassis received in a lower portion of the fourth fixing groove, and the second protruding portion of the front case received in an upper portion of the fourth fixing groove so as to press the first protruding portion. A height of the fourth fixing groove is substantially identical to a sum of heights of the first protruding portion of the top chassis and the second protruding portion of the front case.

In another aspect, there is provided a liquid crystal display apparatus comprising a liquid crystal display module having a first protruding portion and a second protruding portion, and a rear case for receiving the liquid crystal display module wherein the rear case has a fixing groove for guiding and receiving the first protruding portion and a fixing protuberance for fixing the liquid crystal display module.

The liquid crystal display module includes a back light assembly for generating a light, a display unit for receiving the light and displaying an image, a mold frame for receiving the back light assembly and the display unit, and a top chassis combined with the mold frame for fixing the display unit and the back light assembly, which has a first side wall and a second side wall opposed each other wherein first and second protruding portions protruding by a predetermined height from the first and second side walls.

The fixing groove is formed on third and fourth side walls of the rear case corresponding to the first and second side walls of the top chassis. The fixing groove includes a first fixing groove formed from upper faces of the third and fourth side walls of the rear case toward a bottom face of the rear case, and a second fixing groove extended from a lower portion of the first fixing groove toward a fifth side wall of the rear case.

The liquid crystal display module slides toward the second fixing groove of the rear case to be combined with the rear case after the first protruding portion of the top chassis is received in the first groove of the rear case.

The fixing protuberances are formed on the third and said fourth side walls of the rear case corresponding to the second protruding portion formed on the first and second side walls of the top chassis. Also, each fixing protuberance has a supporting portion having a predetermined height toward an opposing side wall, a body extended from an end of the supporting portion toward the fifth side wall and separated by a predetermined interval from the third and the fourth side walls, and a suspending portion protruding from the body and engaging with the second protruding portion of the top chassis, preventing the liquid crystal display module from being moved. The suspending portion has a slope shape gradually wider toward said fifth side wall of the rear case.

According to the liquid crystal display apparatus of the present invention, the liquid crystal display module is fixed in the rear case as protuberances formed on the top chassis are combined with fixing portions formed on the rear case, and also the liquid crystal display module is firmly fixed by fixing protuberances formed on the front case. Therefore, the combining strength between the liquid crystal module and those cases can increase, and productivity of the liquid crystal display apparatus can be improved by reducing the number of parts demanded in fabricating the liquid crystal module and cases.

BRIEF DESCRIPTION OF THE DRAWINGS

The above and other advantages of the present invention will become apparent by describing exemplary embodiment with reference to the attached drawings in which.

DETAILED DESCRIPTION OF THE PREFERRED EMBODIMENT

Hereinafter, a liquid crystal display device according to various embodiments of the present invention will be described in detail with reference to the drawings.

Figure 1:
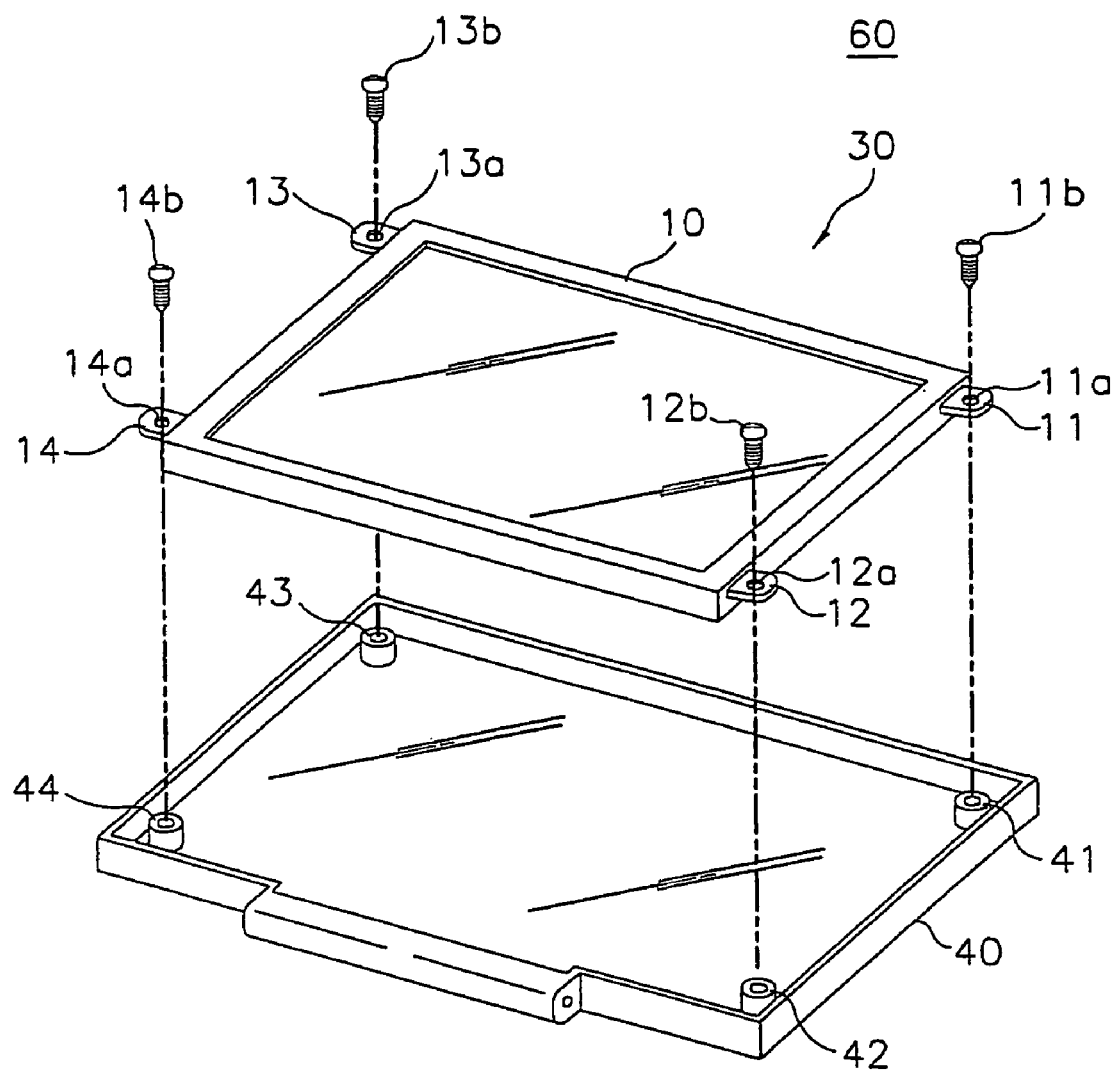
FIG. 1 is an exploded perspective view schematically showing a conventional liquid crystal display apparatus.
Figure 2:
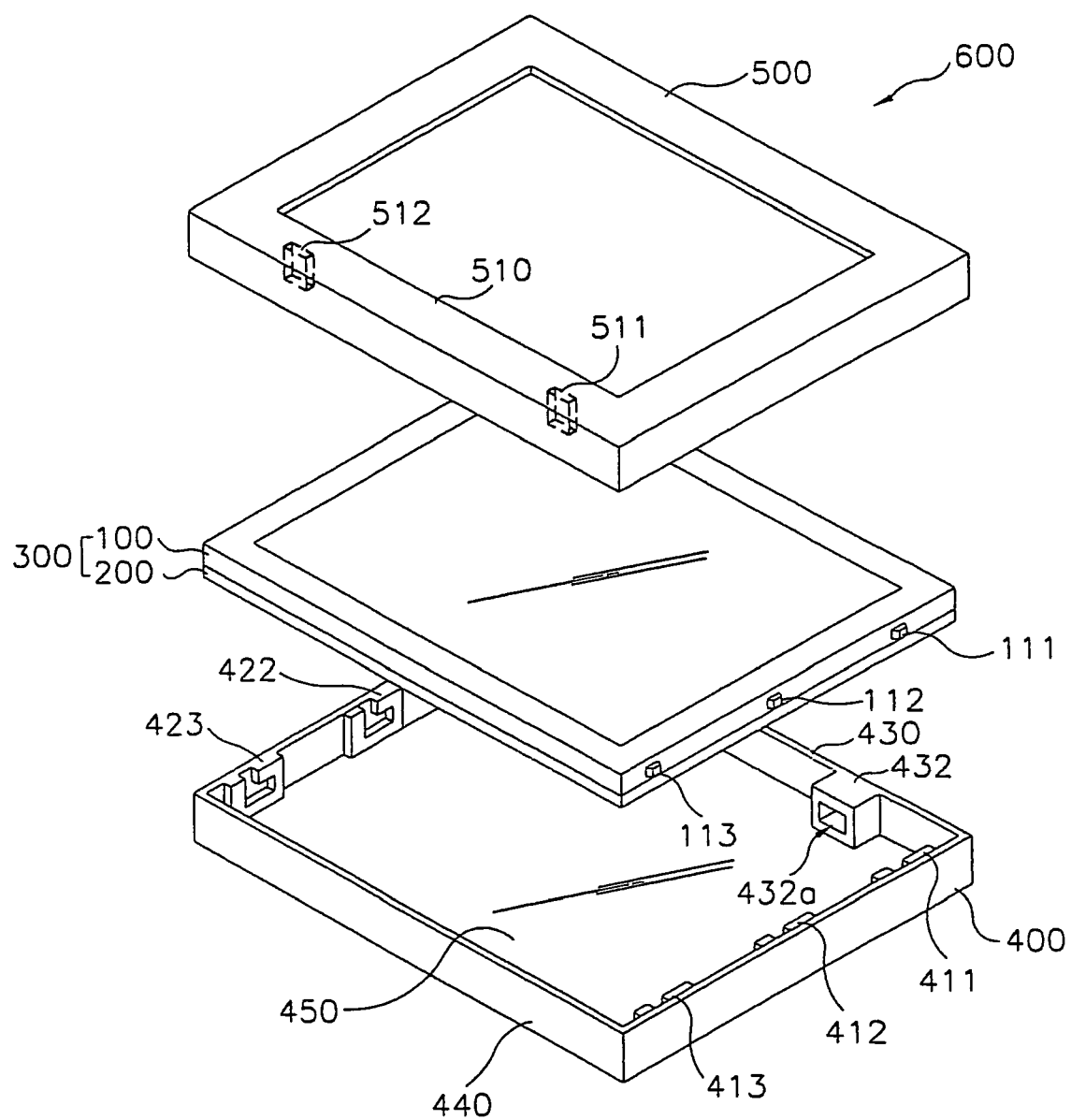
FIG. 2 is an exploded perspective illustrating a liquid crystal display apparatus according to one embodiment of the present invention.
Figure 3:
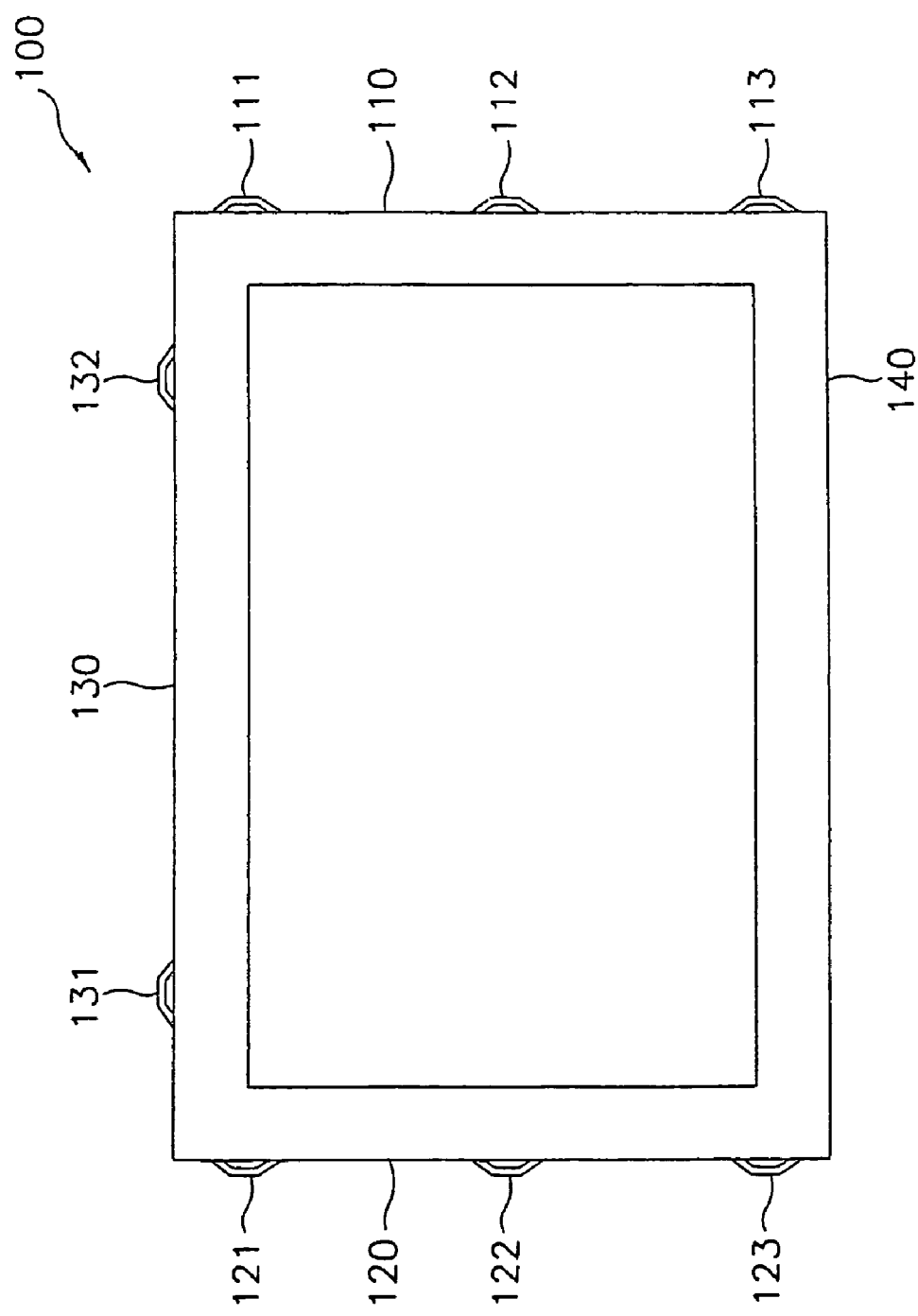
FIG. 3 is a plan view showing a structure of a top chassis shown in FIG. 2.
Figure 4:
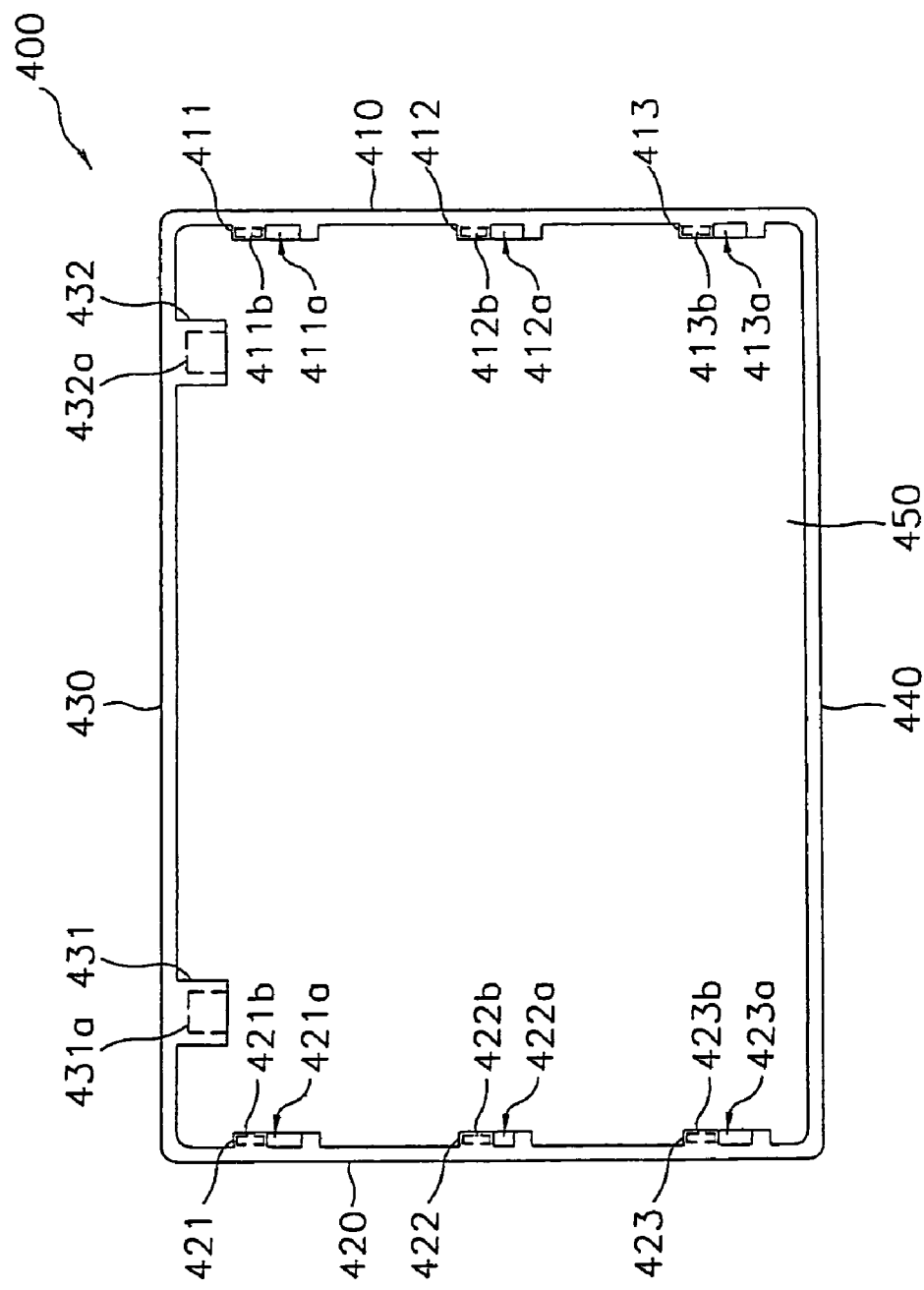
FIG. 4 is a plan view showing a structure of a rear case shown in FIG. 2.
Figure 5:
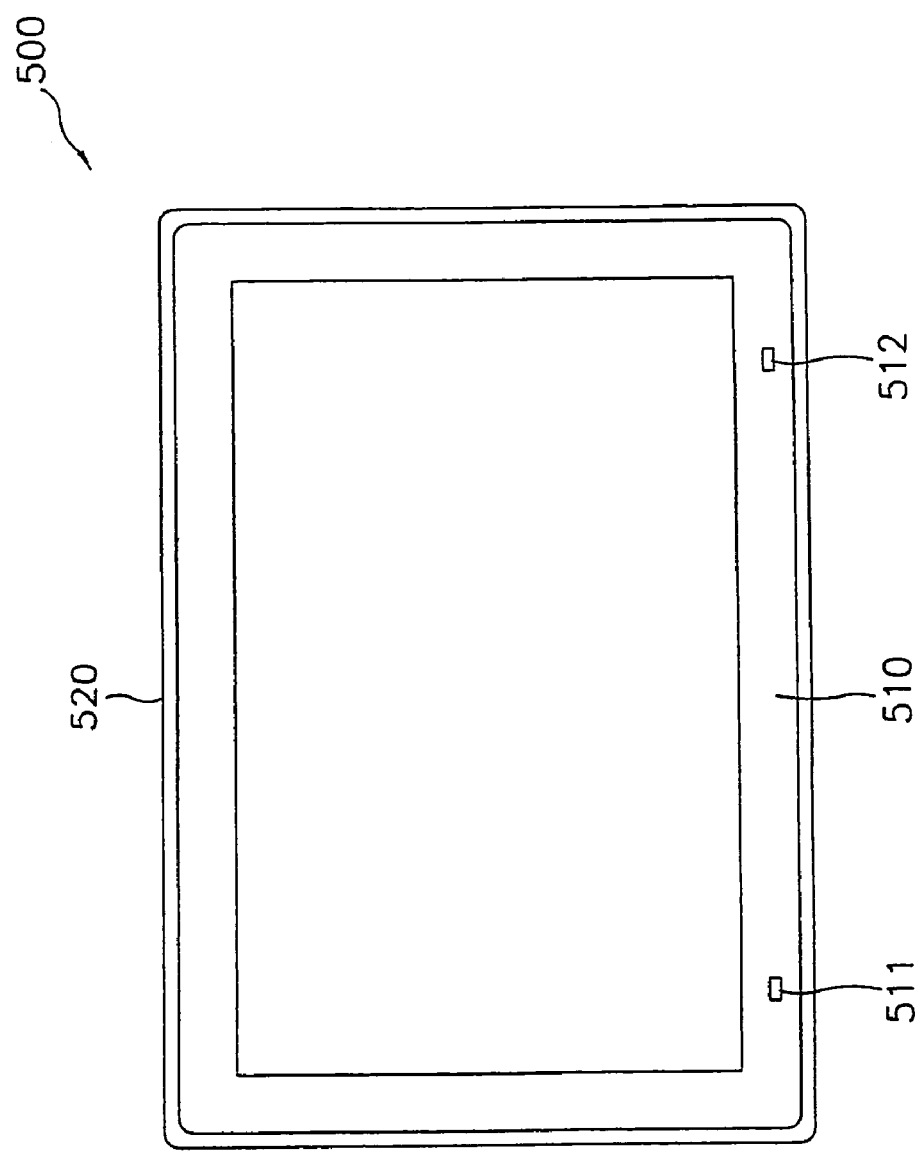
FIG. 5 is a plan view showing a structure of a front case shown in FIG. 2.
Figure 6:
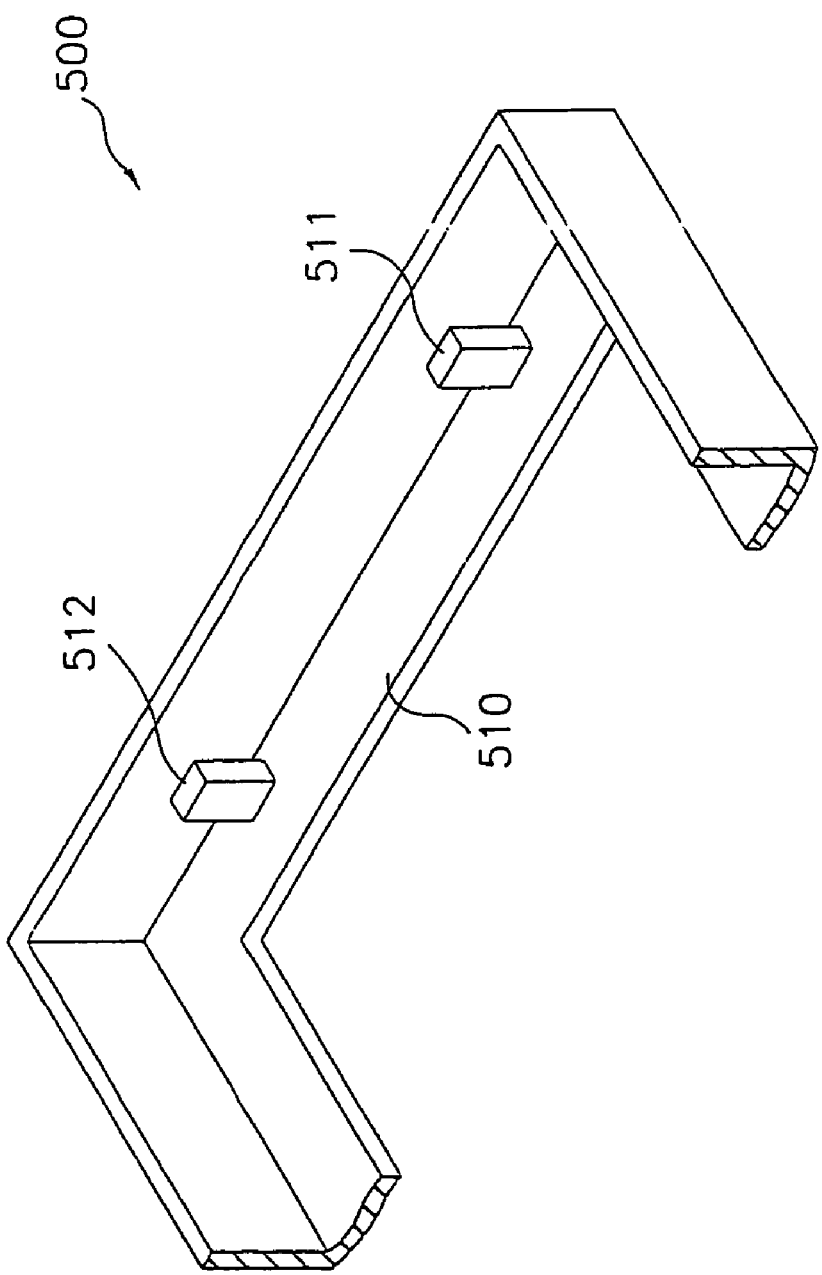
FIG. 6 is partially cut perspective view illustrating the front case shown in FIG. 5.

FIG. 2 is an exploded perspective view showing a liquid crystal display device according to one embodiment of the present invention, FIG. 3 is a plan view illustrating a structure of a top chassis in FIG. 2, FIG. 4 is a plan view showing a structure of a rear case in FIG. 2, FIG. 5 is a plan view showing a structure of a front case in FIG. 2, and FIG. 6 is a partially cut perspective view showing the front case in FIG. 5.

Referring to FIG. 2, a liquid crystal display apparatus 600 has a liquid crystal display module 300 for displaying an image, and cases for receiving the liquid crystal display module 300. Those cases include a front case 500 and a rear case 400.

Figure 7A:
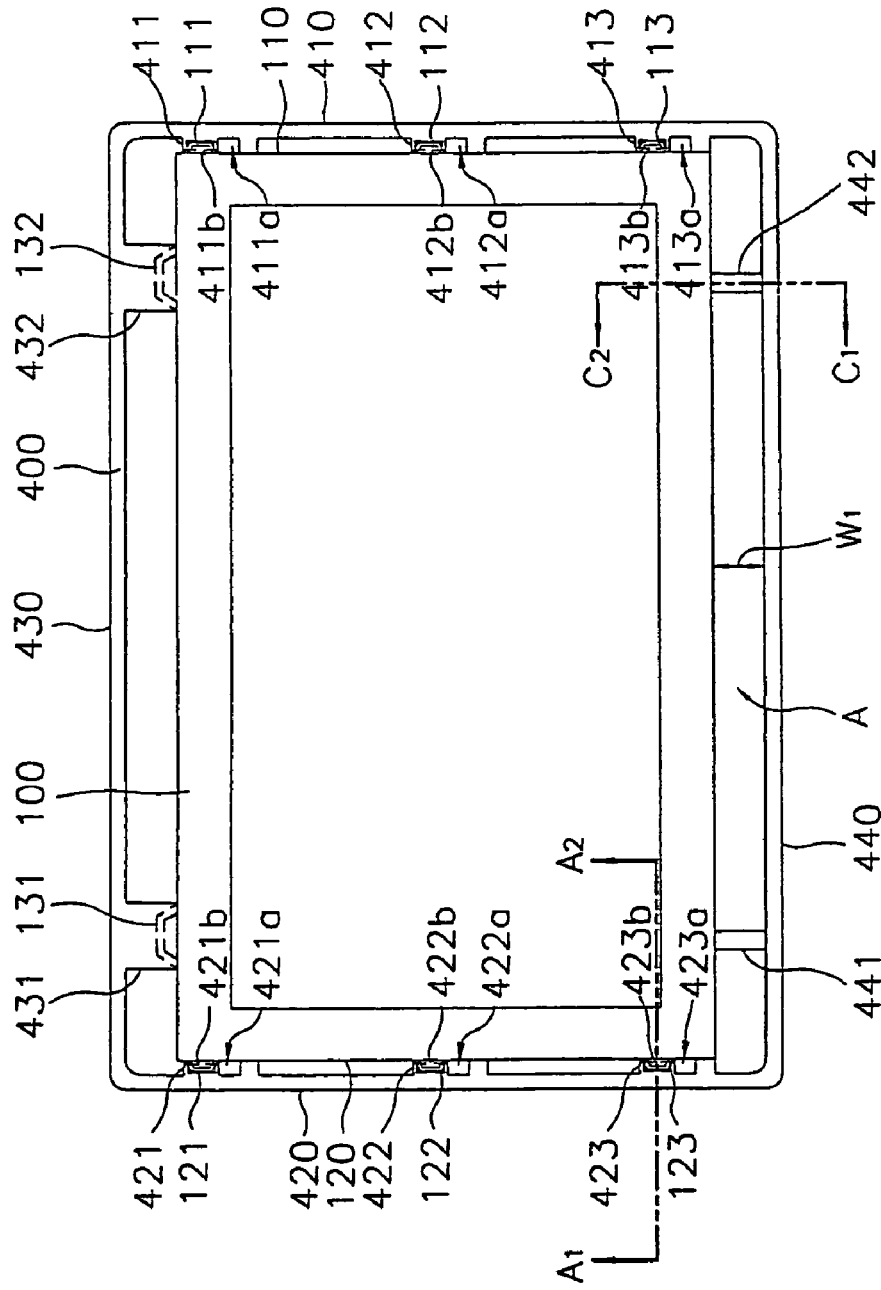
FIG. 7A is a plan view showing an assembled structure between the top chassis and the rear case.
Figure 7B:
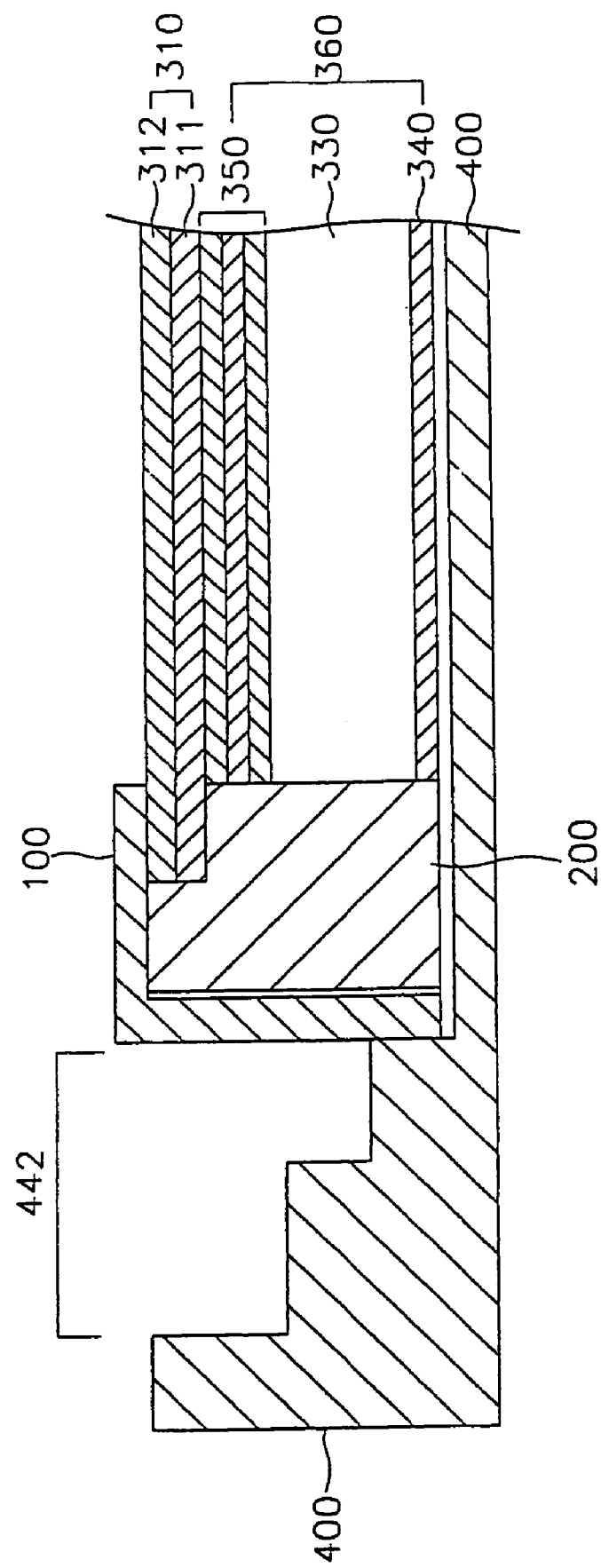
FIG. 7B is a cross-sectional view taken along the line of $C_1$-$C_2$ for illustrating the assembled structure between the top chassis and the rear case shown in FIG. 7A.

The liquid crystal display module 300 includes a display unit 310 for displaying the image, and a back light assembly 360 disposed under the display unit 310 for supplying a light to the display unit 310 (see FIG. 7B). The display unit 310 and the back light assembly 360 are received in a mold frame 200. Also, a top chassis 100 is provided for fixing the display unit 310 and the back light assembly 360 to the mold frame 200.

In particular, when the back light assembly 360 and the display unit 310 are subsequently received in the mold frame 200, the top chassis 100 is provided on the display unit 310. The top chassis 100 has a rectangular cramp shape. The top chassis 100 covers an upper portion of the display unit 310 except for an effective display area of the display unit 310. The top chassis 100 is combined with the mold frame 200 so that inner surfaces of four side walls of the top chassis 100 correspond to outer surfaces of side walls of the mold frame 200.

As shown in FIGS. 2 and 3, the top chassis 100 has a first side wall 110, a second side wall 120, a third side wall 130 and a fourth side wall 140. First to third protuberances 111, 112 and 113 respectively having a predetermined height are formed on the first side wall 110 of the top chassis 100, and fourth to sixth protuberances 121, 122 and 123 respectively having a predetermined height are formed on the second side wall 120 of the top chassis 100. The second side wall 120 is opposed to the first side wall 110. In addition, seventh and eighth protuberances 131 and 132 are formed on the third side wall 130, which locates between the first side wall 110 and the second side wall 120. The first to eighth protuberances 111, 112, 113, 121, 122, 123, 131 and 132 can be formed by partially cutting predetermined portions of the first to third side walls 110, 120 and 130 of the top chassis 100 and extending the portions toward outside. The first to eighth protuberances 111, 112, 113, 121, 122, 123, 131 and 132 may have various shapes such as hemi-circular shapes, trapezoidal shapes or rectangular shapes when the first to eighth protuberances 111, 112, 113, 121, 122, 123, 131 and 132 are observed from the direction of the cases 500 and 400. Preferably, the first to eighth protuberances 111, 112, 113, 121, 122, 123, 131 and 132 have trapezoidal shapes, respectively.

Referring to FIGS. 2 and 4, the rear case 400 includes fifth to eighth side walls 410, 420, 430 and 440, and a bottom face 450 enclosed by the fifth to eighth side walls 410, 420, 430 and 440. An upper face of the rear case 400 corresponding to the bottom face 450 is opened. First to third protruding portions 411, 412 and 413 having a predetermined height are formed on the fifth side wall 410 of the rear case 400, which corresponds to and is combined with the first side wall 110 of the top chassis 100. Also, fourth to sixth protruding portions 421, 422 and 423 having a predetermined height are formed on the sixth side wall 420 of the rear case 400, which corresponds to and is combined with the second side wall 120 of the top chassis 100. Furthermore, seventh and eighth protruding portions 431 and 432 having a predetermined height are formed on the seventh side wall 430 of the rear case 400, which corresponds to and is combined with the third side wall 130 of the top chassis 100.

First to sixth fixing grooves 411a, 412a, 413a, 421a, 422a and 423a are respectively formed on the first to sixth protruding portions 411, 412, 413, 421, 422 and 423 so as to be combined with the first to sixth protuberances 111, 112, 113, 121, 122 and 123 formed on the first and second side walls 110 and 120 of the top chassis 100. In addition, seventh to twelfth fixing grooves 411b, 412b, 413b, 421b, 422b and 423b are formed on the first to sixth protruding portions 411, 412, 413, 421, 422 and 423. The first to sixth fixing grooves 411a, 412a, 413a, 421a, 422a and 423a are respectively formed from upper ends of the fifth and sixth side walls 410 and 420 of the rear case 400 toward the bottom face 450 of the rear case 400. The seventh to twelfth fixing grooves 411b, 412b, 413b, 421b, 422b and 423b are respectively extended from lower portions of the first and sixth fixing grooves 411a, 412a, 413a, 421a, 422a and 423a toward the seventh side wall 430 of the rear case 400. Thus, each corresponding pair of the first to sixth fixing grooves 411a, 412a, 413a, 421a, 422a and 423a and the seventh to twelfth fixing grooves 411b, 412b, 413b, 421b, 422b and 423b may form a shape of "L".

Thirteenth and fourteenth fixing grooves 431a and 432a are formed on the seventh and eighth protruding portions 431 and 432 positioned on the seventh side wall 430 of the rear case 400 so that the thirteenth and fourteenth fixing grooves 431a and 432a are combined with the seventh and eighth protuberances 131 and 132 formed on the third side wall 130 of the top chassis 100.

The rear case 400 includes first and second suspending protuberances 441 and 442 respectively extended from the bottom face 450 and the eighth side wall 440. The first and second suspending protuberances 441 and 442 will be described in detail with reference to FIGS. 7A and 7B.

Figure 16:
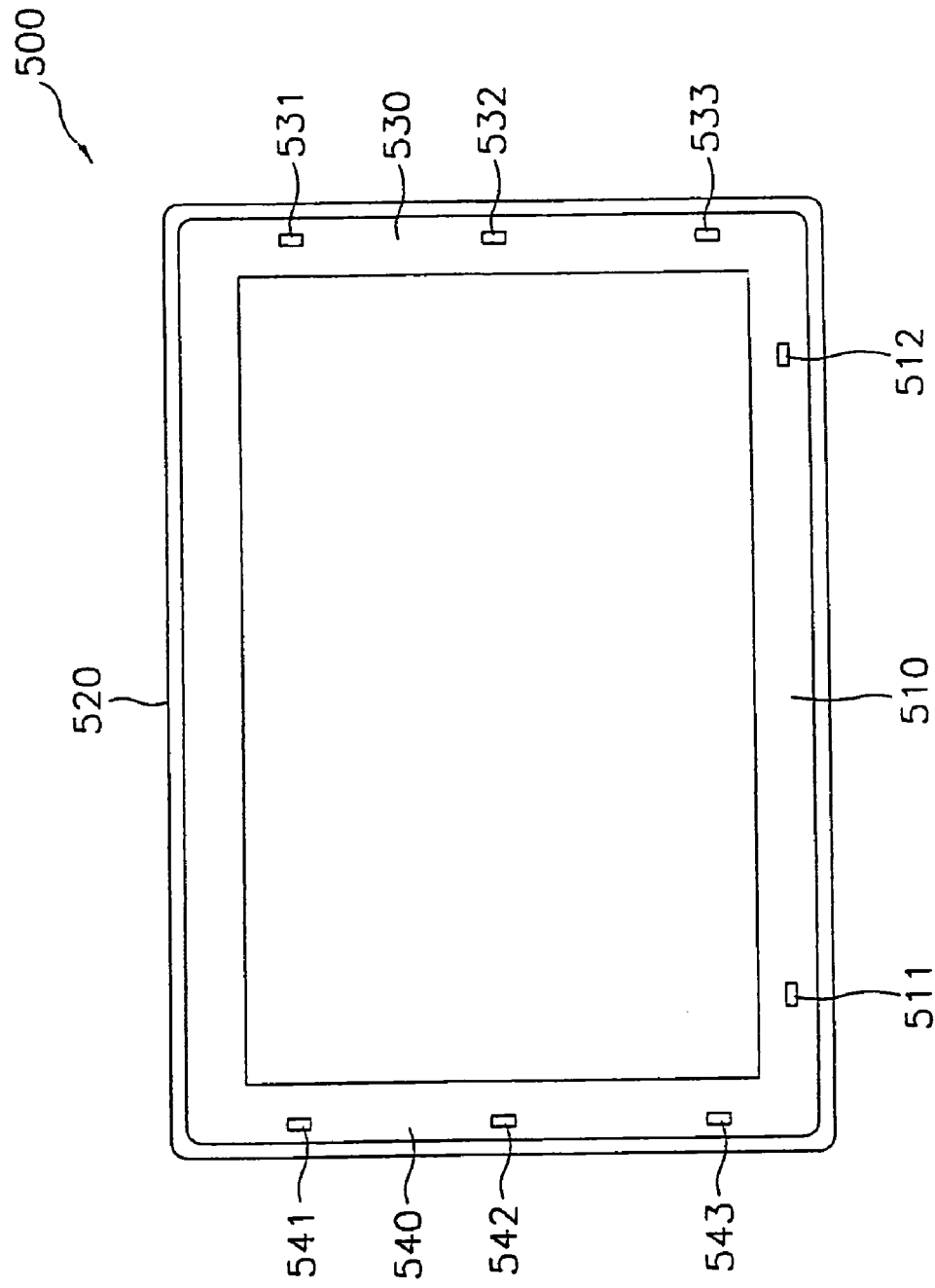
FIG. 16 is a plan view showing a front case according to another embodiment of the present invention.

Referring to FIGS. 5 and 6, and further FIG. 16, the front case 500 has four side walls, and first to fourth top faces 510, 520, 530 and 540. The four side walls of the front case 500 are combined with the fifth to eighth side walls 410, 420, 430, and 440 of the rear case 400, and the first to fourth top faces 510, 520, 530 and 540 cover a non-effective display area of the liquid display module 300. Also, a lower face of the front case 500 corresponding to an effective display area of the liquid display module 300 is opened.

Ninth and tenth protuberances 511 and 512 are formed on the first top face 510 of the front case 500 positioned over the eighth side wall 440 of the rear case 400. Each of the ninth and tenth protuberances 511 and 512 has a substantially same height as a height of the eighth side wall 440 of the rear case 400 as shown in FIG. 6. The ninth and tenth protuberances 511 and 512 will be described more detail with reference to cross-sectional views.

Figure 8:
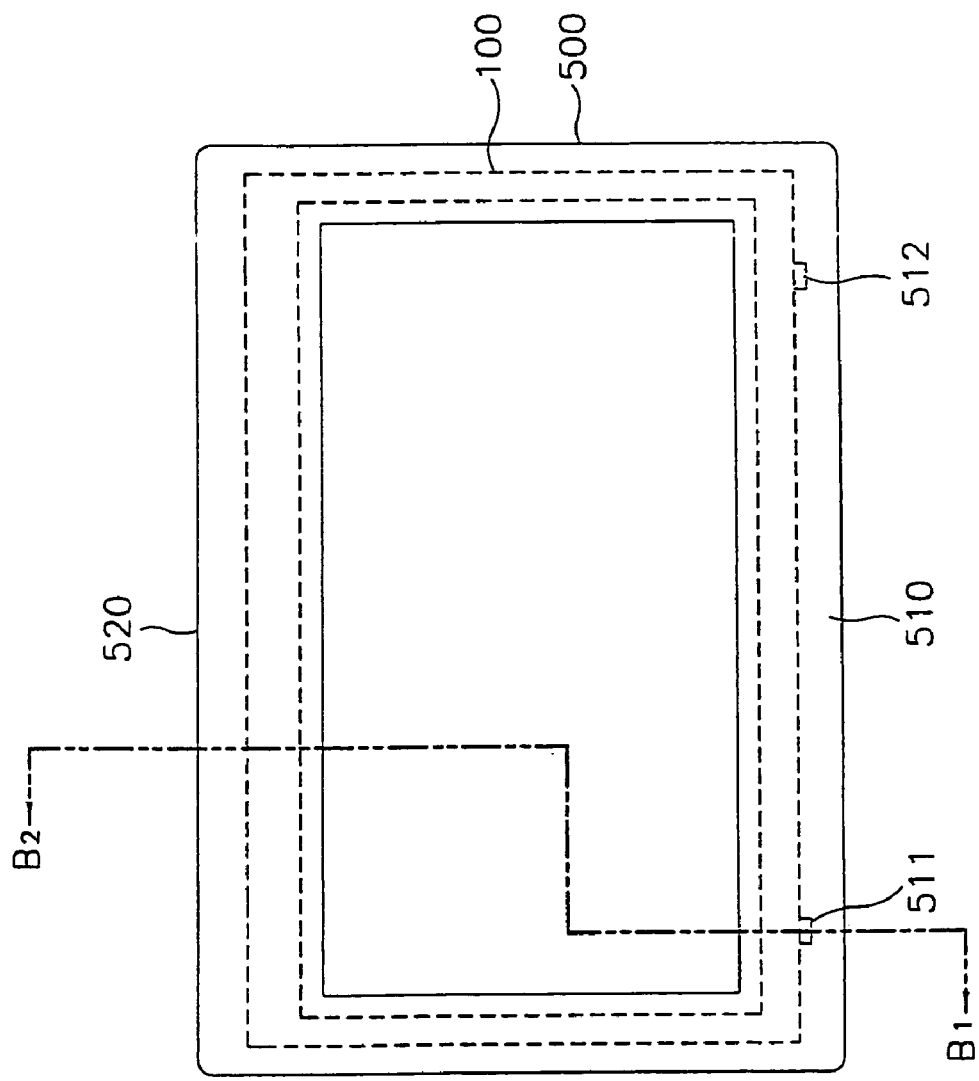
FIG. 8 is a plan view showing an assembled structure among the front case, the top chassis and the rear case shown in FIG. 7A.

FIG. 7A is a plan view showing an assembled structure between the top chassis and the rear case, FIG. 7B is a cross-sectional view taken along the line of $C_1$-$C_2$ for illustrating the assembled structure between the top chassis and the rear case, and FIG. 8 is a plan view showing an assembled structure among the front case, the top chassis and the rear case.

When the liquid crystal display module 300 including the display unit 310 is received in the rear case 400 as shown in FIG. 7B, the first to third protuberances 111, 112 and 113 formed on the first side wall 110 of the top chassis 100 are respectively combined with the first to third fixing grooves 411a, 412a and 413a formed on the fifth side wall 410 of the rear case 400. Also, the fourth to sixth protuberances 121, 122 and 123 formed on the second side wall 120 of the top chassis 100 are respectively combined with the fourth to sixth fixing grooves 421a, 422a and 423a formed on the sixth side wall 420 of the rear case 400, as shown in FIG. 7A.

Figure 9:
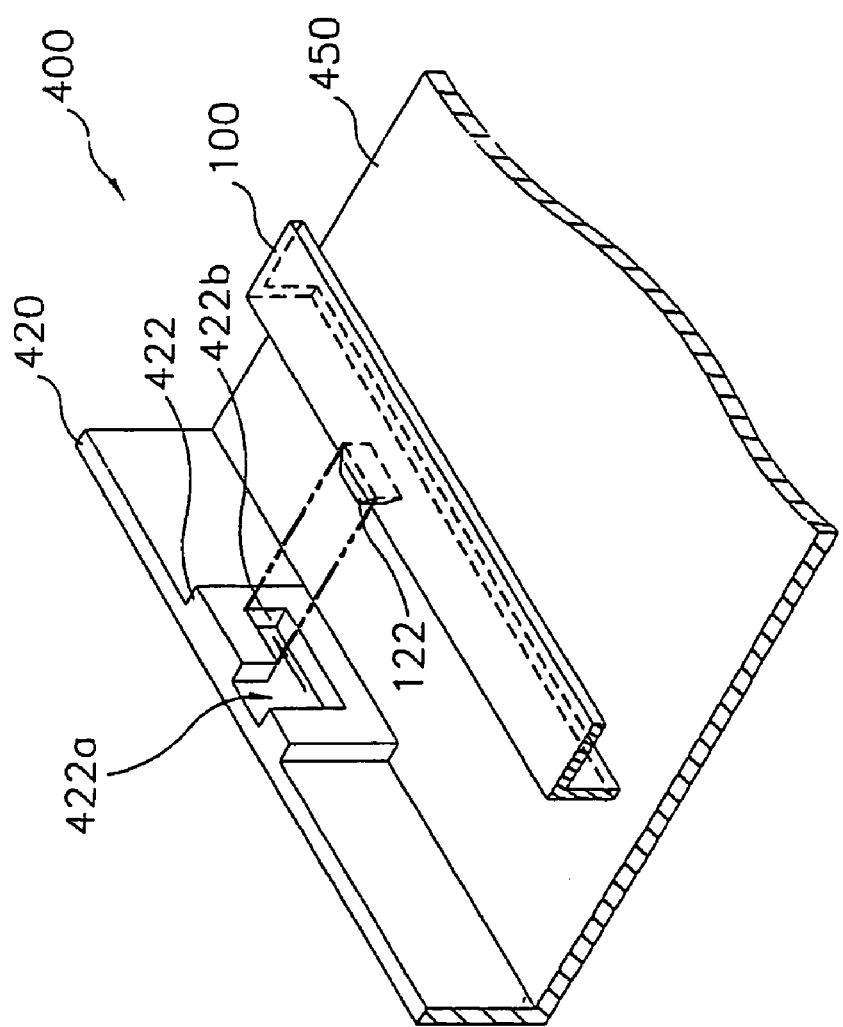
FIGS. 9 to 11 are partially cut perspective views illustrating a method for combining the top chassis with the rear case.
Figure 10:
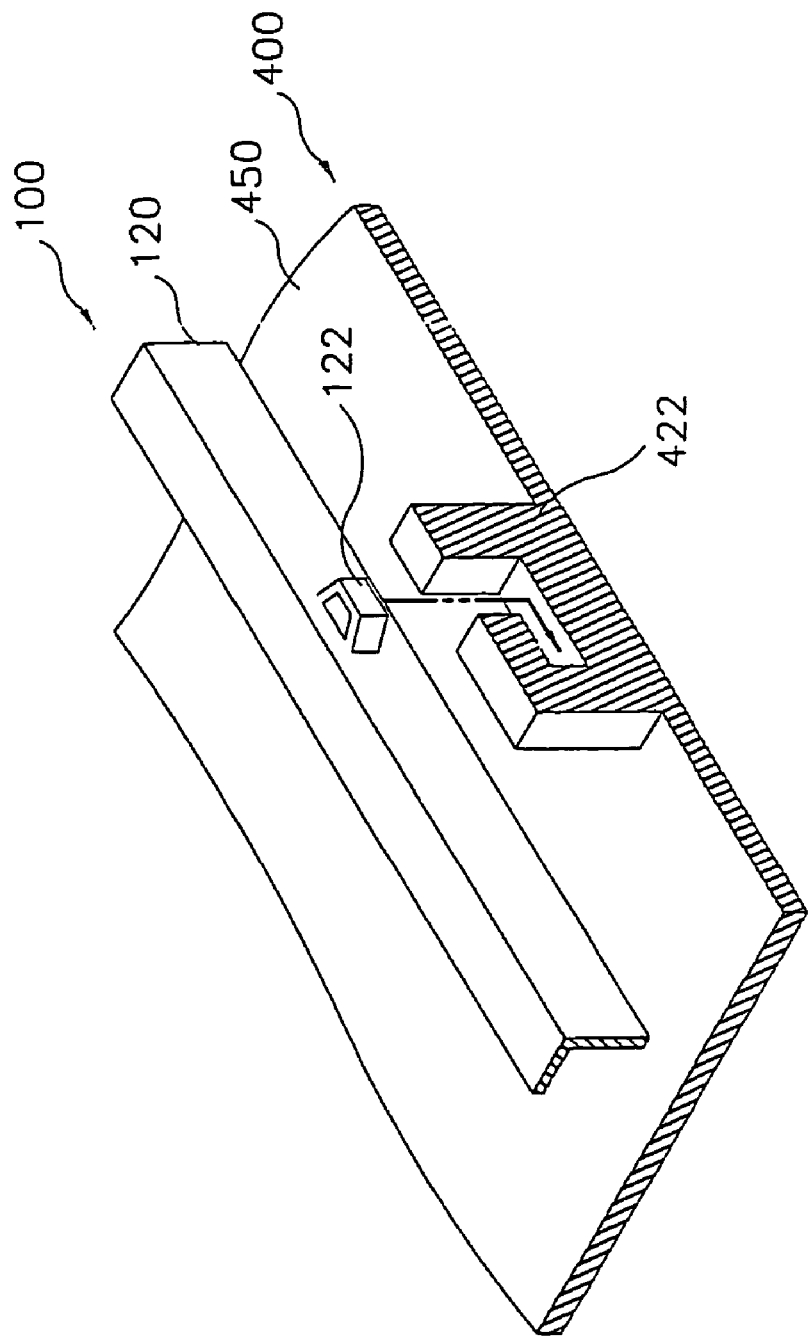
Figure 11:
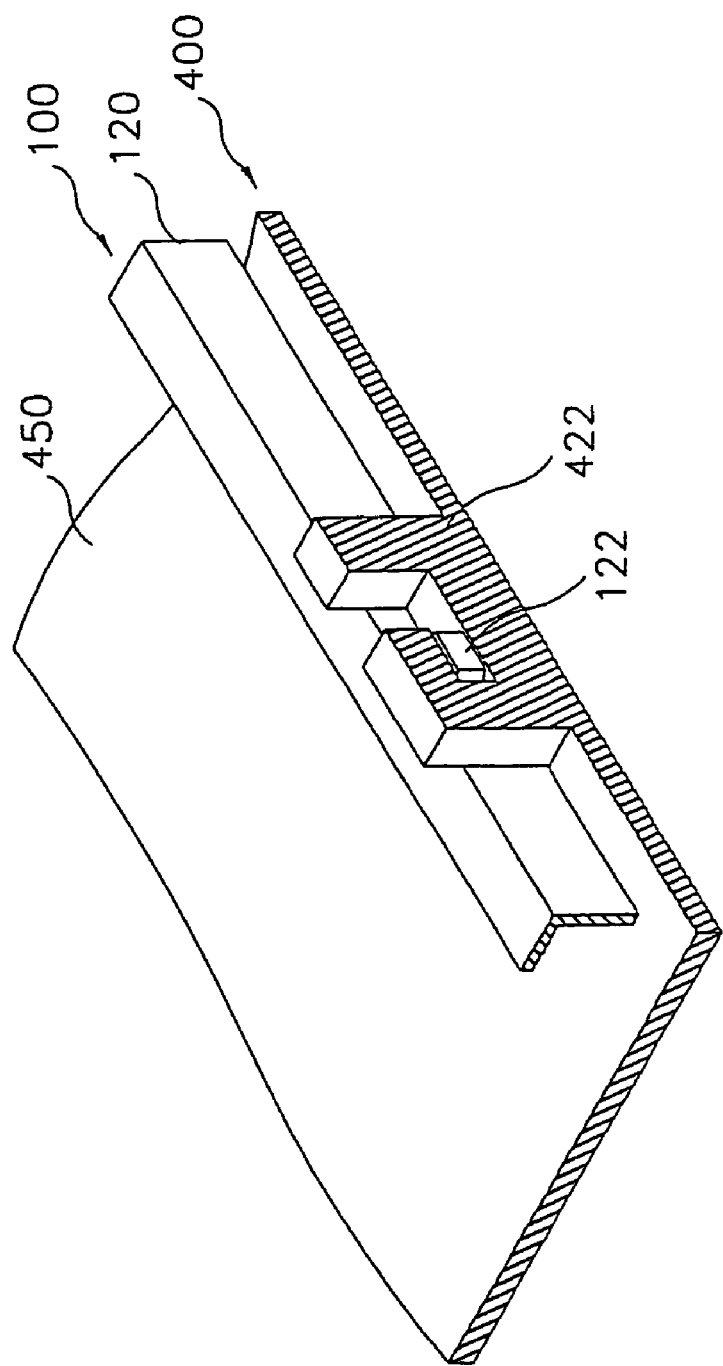

Then, the first to sixth protuberances 111, 112, 113, 121, 122 and 123 move toward the seventh side wall 430 of the rear case 400, so the first to sixth protuberances 111, 112, 113, 121, 122 and 123 are received in the seventh to twelfth fixing grooves 411b, 412b, 413b, 421b, 422b and 423b, respectively. In this way, the rear case 400 is combined with the top chassis 100, which is illustrated in FIGS. 9-11. The seventh and eighth protuberances 131 and 132 formed on the third side wall 130 of the top chassis 100 are respectively combined with the thirteenth and fourteenth fixing grooves 431a and 432a formed on the seventh side wall 430 of the rear case 400.

When the liquid crystal display module 300 moves toward the seventh side wall 430 of the rear case 400 to be combined with the rear case 400, an isolation space A is formed between the eighth side wall 440 of the rear case 400 and the fourth side wall 140 of the top chassis 100.

Referring to FIG. 7B, the first and second suspending protuberances 441 and 442 are protruded from the eighth side wall 440 of the rear case 400 toward the liquid crystal display module 300 along the bottom face 450 of the rear case 400. The first and second suspending protuberances 441 and 442 have terraced shapes gradually lowered from the eighth side wall 440 to the liquid crystal display module 300. The widths of the first and second suspending protuberances 441 and 442 are identical to a width W1 of the isolation space A between the liquid crystal module 300 and the eighth side wall 440 of the rear case 400. Hence, an end of the liquid crystal display module 300 moves along the first and second suspending protuberances 441 and 442 of the rear case 400 when the liquid crystal display module 300 moves toward the seventh side wall 430 after the liquid crystal display module 300 is received in the rear case 400. A predetermined portion of the fourth side wall 140 of the top chassis 100 corresponds to terraced portions of the first and second suspending protuberances 441 and 442 when the liquid crystal display module 300 completely moves, thereby preventing the liquid crystal display module 300 from being moved toward the eighth side wall 440 of the rear case 400.

Figure 15:
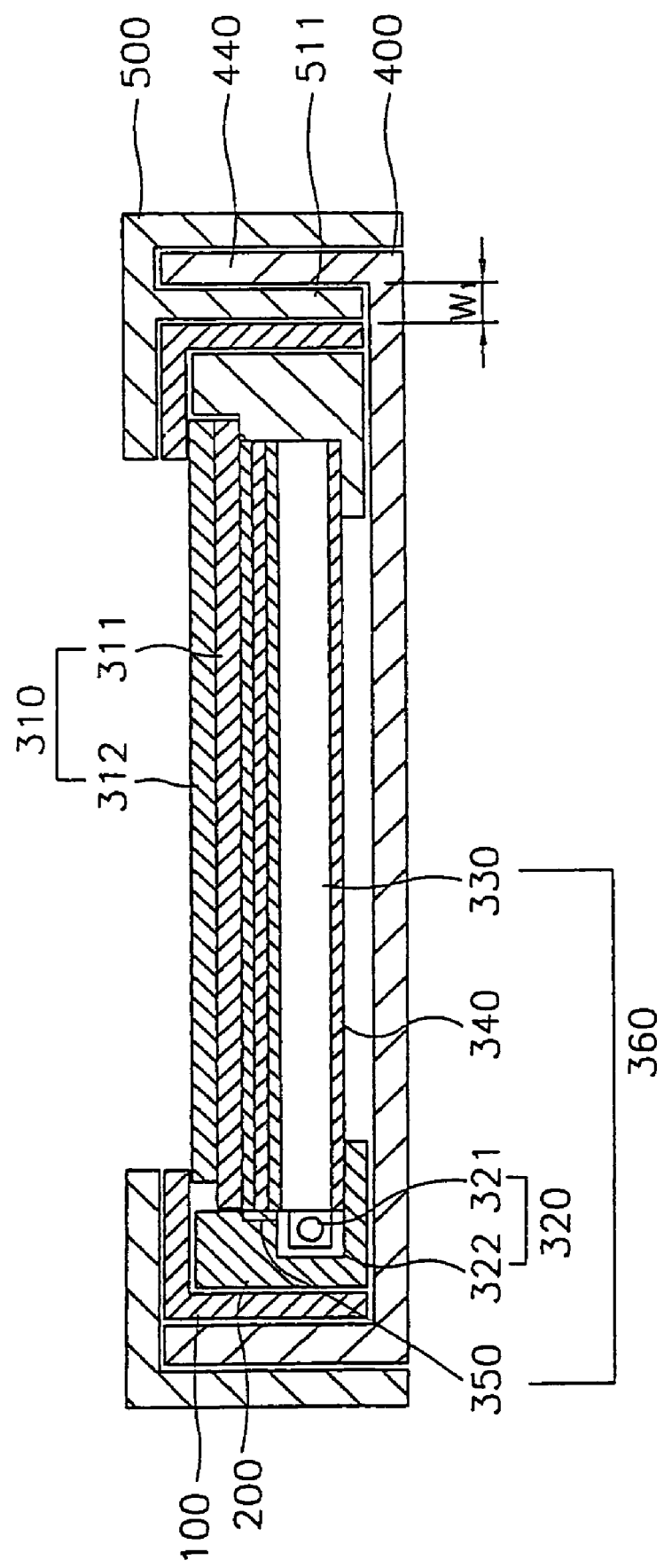
FIG. 15 is a cross-sectional view taken along the line of $B_1$-$B_2$ for illustrating the assembled structure of the liquid crystal display device shown in FIG. 8.

The front case 500 is combined with the rear case 400 while the liquid crystal display module 300 is received in the rear case 400. The ninth and tenth protuberances 511 and 512 are inserted into the isolation space A between the rear case 400 and the top chassis 100. Widths of the ninth and tenth protuberances 511 and 512 are substantially identical to the width W1 of the isolation space A so that the ninth and tenth protuberances 511 and 512 are tightly inserted into the isolation space A. Thus, the liquid crystal display module 300 does not move in the isolation space A by the ninth and tenth protuberances 511 and 512, as shown in FIGS. 8 and 15.

Figure 12:
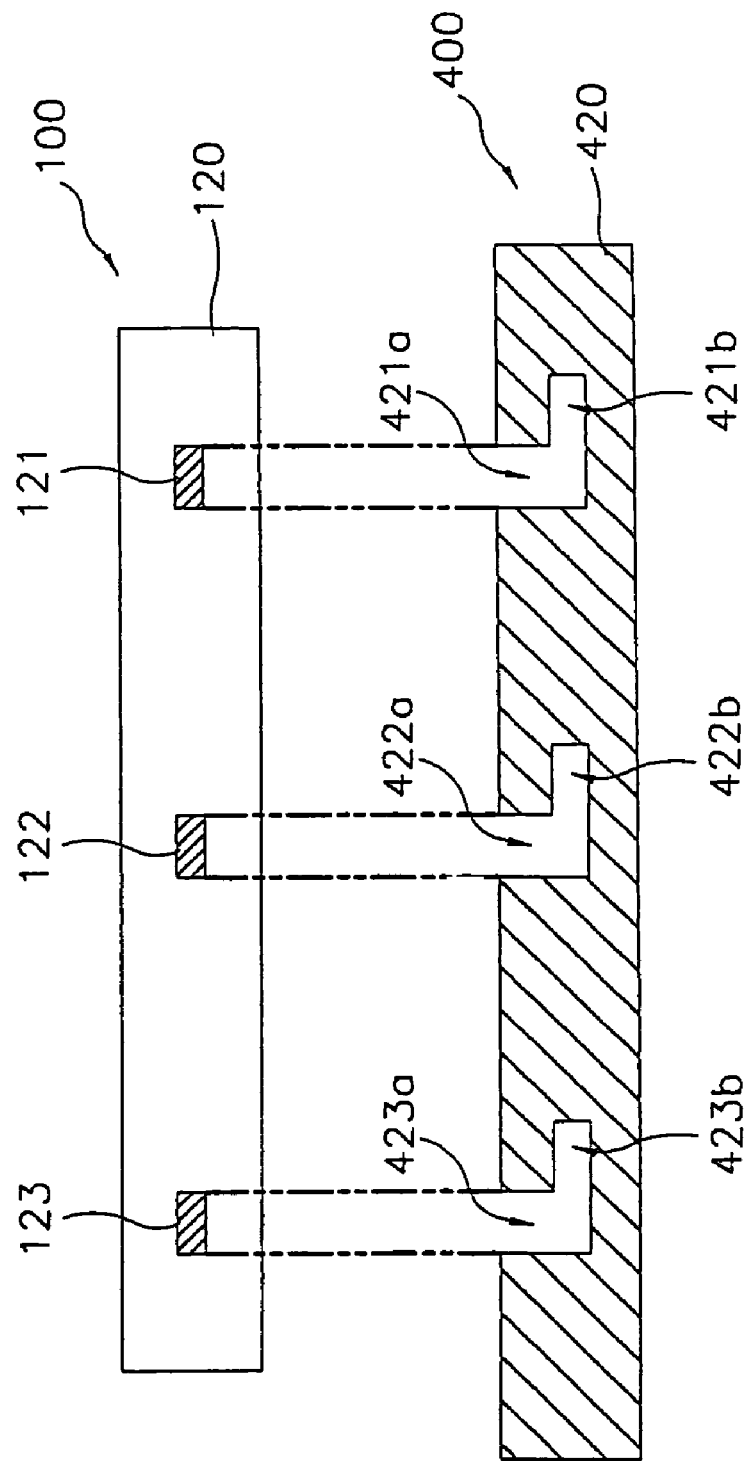
FIGS. 12 and 13 are cross-sectional views illustrating the method for combining the top chassis with the rear case.
Figure 13:
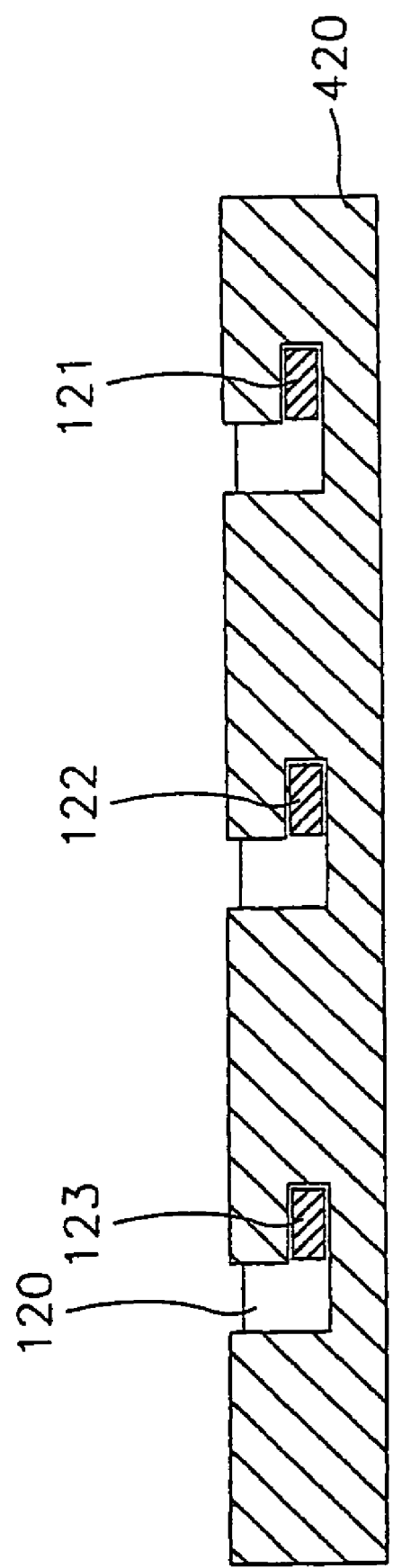

FIGS. 9 to 11 are partially cut perspective views illustrating a method for combining the top chassis with the rear case, and FIGS. 12 and 13 are cross-sectional views illustrating the method for combining the top chassis with the rear case.

Referring to FIGS. 9 to 13, the fifth protuberance 422 formed on the sixth side wall 420 of the rear case 400 includes the fifth fixing groove 422a formed from the upper face of the sixth side wall 420 toward the bottom face 450 of the rear case 400, and the eleventh fixing groove 422b extended from the lower portion of the fifth fixing groove 422a toward the seventh side wall 430 of the rear case 400.

The fifth fixing groove 422a is higher than the eleventh fixing groove 422b. That is, an upper face of the eleventh fixing groove 422b is not exposed to the upper face of the sixth side wall 420.

The fifth protuberance 122 protruding toward the sixth side wall 420 of the rear case 400 by a predetermined height is formed on the second side wall 120 of the top chassis 100 corresponding to the sixth side wall 420 of the rear case 400. A portion of the second side wall 120 of the top chassis 100 is partially cut in the direction parallel with the bottom face 450 of the rear case 400, and the cut portion of the second side wall 120 of the top chassis 100 is extended toward the sixth side wall 420 of the rear case 400. The fifth protuberance 122 protrudes toward the sixth side wall 420 of the rear case 400.

When the top chassis 100 is received in the rear case 400, the fifth protuberance 122 of the top chassis 100 is inserted into the fifth fixing groove 422a of the rear case 400. The liquid crystal display module 300 moves toward the seventh side wall 430 of the rear case 400 when the fifth protuberance 122 makes contact with a bottom face of the fifth fixing groove 422a. The fifth protuberance 122 is combined with the eleventh fixing groove 422b so that the liquid crystal display module 300 is fixed in the rear case 400. Namely, the fifth protuberance 122 is fixed by an upper end of the fifth protruding portion 422 adjacent the eleventh fixing groove 422b, thereby preventing the liquid crystal display module 300 from being moved through the opened upper face of the rear case 400. Therefore, the liquid crystal display module 300 received in the rear case 400 cannot move through the opened upper face of the rear case 400.

Figure 14:
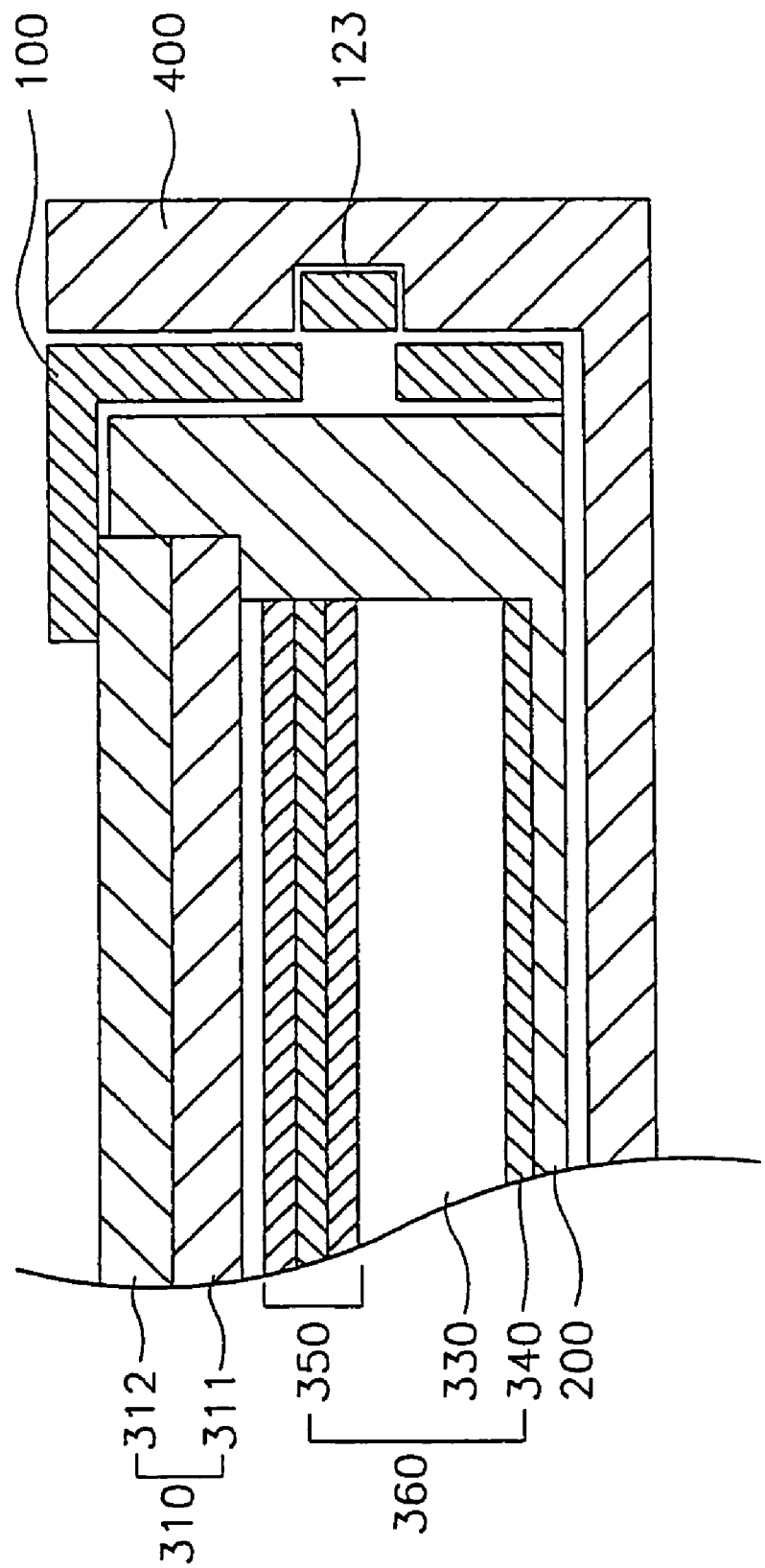
FIG. 14 is a cross-sectional view taken along the line of $A_1$-$A_2$ for illustrating the assembled structure of the top chassis and the rear case shown in FIG. 7A.

FIG. 14 is a cross-sectional view taken along the line of $A_1$-$A_2$ for illustrating the assembled structure of the top chassis and the rear case shown in FIG. 7A, and FIG. 15 is a cross-sectional view taken along the line of $B_1$-$B_2$ for illustrating the assembled structure of the liquid crystal display device shown in FIG. 8.

Referring to FIG. 14, the back light assembly 360 is received in the mold frame 200. In particular, a reflection plate 340 is received in a bottom face of the mold frame 200, and then a light guiding plate 330 is mounted thereon. Optical sheets 350 are mounted on the light guiding plate 330 so that the back light assembly 360 is received in the mold frame 200. The display unit 310 is mounted on the back light assembly 360.

When the back light assembly 360 and the display unit 310 are received in the mold frame 200, the top chassis 100 is provided for fixing the back light assembly 360 and the display unit 310 in the mold frame 200. The top chassis 100 is combined with the mold frame 200, thereby completing the liquid crystal display module 300.

The completed liquid crystal display module 300 is received in the rear case 400. The sixth protuberance 123 formed on the second side wall 120 of the top chassis 100 is combined with the sixth and twelfth fixing grooves 423a and 423b formed on the sixth side wall 420 of the rear case 400. That is, the sixth protuberance 123 of the top chassis 100 moves along the sixth fixing groove 423a toward the twelfth fixing groove 423b to be combined therewith. Hence, the liquid crystal display module 300 is fixed in the rear case 400 so that the liquid crystal display module 300 is not separated from the rear case 400 through the opened upper face of the rear case 400.

Referring to FIG. 15, the front case 500 is combined with the rear case 400 after the liquid crystal display module 300 is received in the rear case 400. The ninth protuberance 511 is formed on the first upper face 510 of the front case 500.

The ninth protuberance 511 protrudes from the first upper face 510 toward the rear case 400 and has a width substantially identical to the width W1 of the isolation space A formed between the liquid crystal display module 300 and the rear case 400. Also, a height of the ninth protuberance 511 is identical to a height of the eighth side wall 440.

When the liquid crystal display module 300 is received in the rear case 400, the liquid crystal display module 300 moves toward the seventh side wall 430 of the rear case 400 to be combined therewith. The isolation space A is formed between the eighth side wall 440 of the rear case 400 and the fourth side wall 140 of the top chassis 100. The ninth protuberance 511 formed on the first upper face 510 of the front case 500 is inserted into the isolation space A. Therefore, the liquid crystal display module 300 does not move toward the eighth side wall 440 of the rear case 400.

Figure 17:
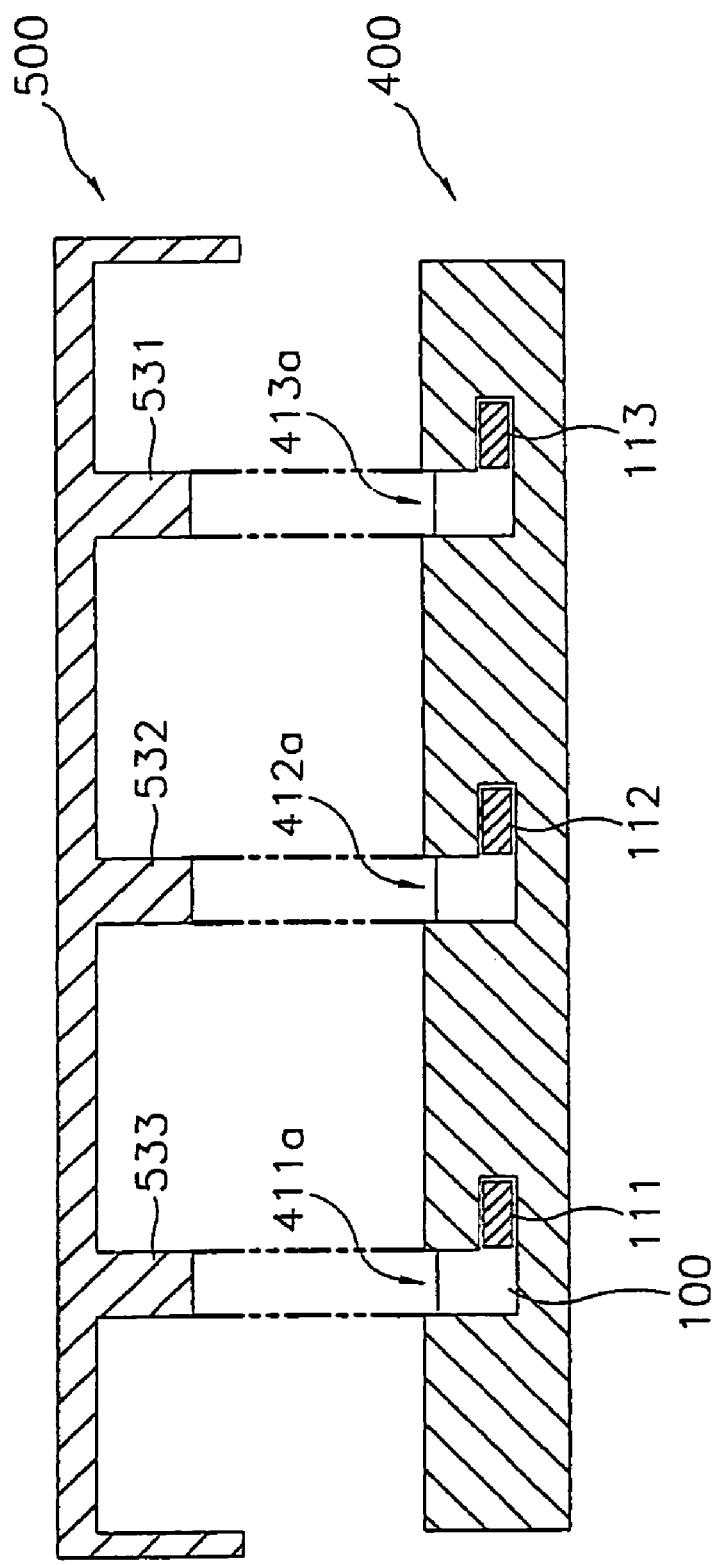
FIGS. 17 and 18 are cross-sectional views illustrating a combination of the front case and the rear case.
Figure 18:
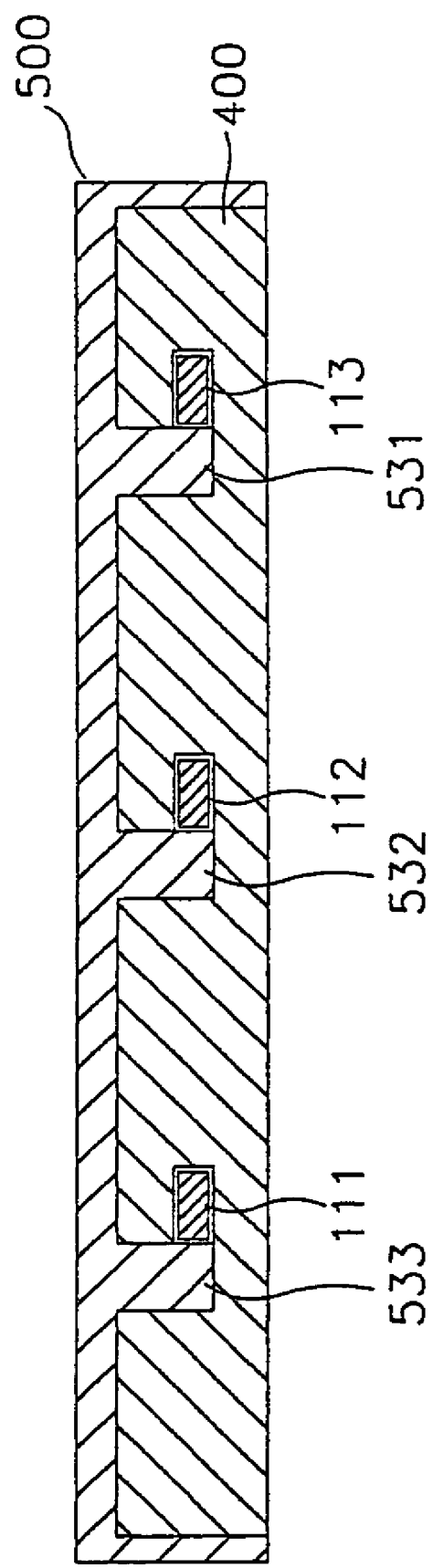

FIG. 16 is a plan view showing a front case according to another embodiment of the present invention, and FIGS. 17 and 18 are cross-sectional views illustrating a combination of the front case and the rear case shown in FIG. 16.

Referring to FIG. 16, eleventh to sixteenth protuberances 531, 532, 533, 541, 542 and 543 toward the bottom face 450 of the rear case 400 are respectively formed on the third and fourth upper faces 530 and 540 of the front case 500 except the first and second upper faces 510 and 520 of the front case 500. The eleventh to sixteenth protuberances 531, 532, 533, 541, 542 and 543 correspond to the first to sixth fixing grooves 411a, 412a, 413a, 421a, 422a and 423a of the rear case 400, respectively. In addition, the eleventh to sixteenth protuberances 531, 532, 533, 541, 542 and 543 are spaced from the side walls of the front case 500 by a length identical to a width of each of the fifth and sixth side walls 410 and 420 of the rear case 400.

As shown in FIGS. 17 and 18, after the liquid crystal display module 300 is received in the rear case 400, the eleventh to thirteenth protuberances 531, 532 and 533 are respectively inserted into the first to third fixing grooves 411a, 412a and 413a when the front case 500 is combined with the rear case 400. Heights of the eleventh to thirteenth protuberances 531, 532 and 533 are substantially the same as those of the first to third fixing grooves 411a, 412a and 413a. As a result, a wall of each of the eleventh to thirteenth protuberances 531, 532 and 533 close an inlet of each of the seventh to ninth fixing grooves 411b, 412b and 413b when the eleventh to thirteenth protuberances 531, 532 and 533 are received in the first to third fixing grooves 411a, 412a and 413a. Therefore, the liquid crystal display module 300 cannot move toward the eighth side wall 440 of the rear case 400.

Hereinafter, it will be described an assembled structure of a liquid crystal display module and cases of a liquid crystal display apparatus according to another embodiment of the present invention with reference to FIGS. 19 to 24.

Figure 19:
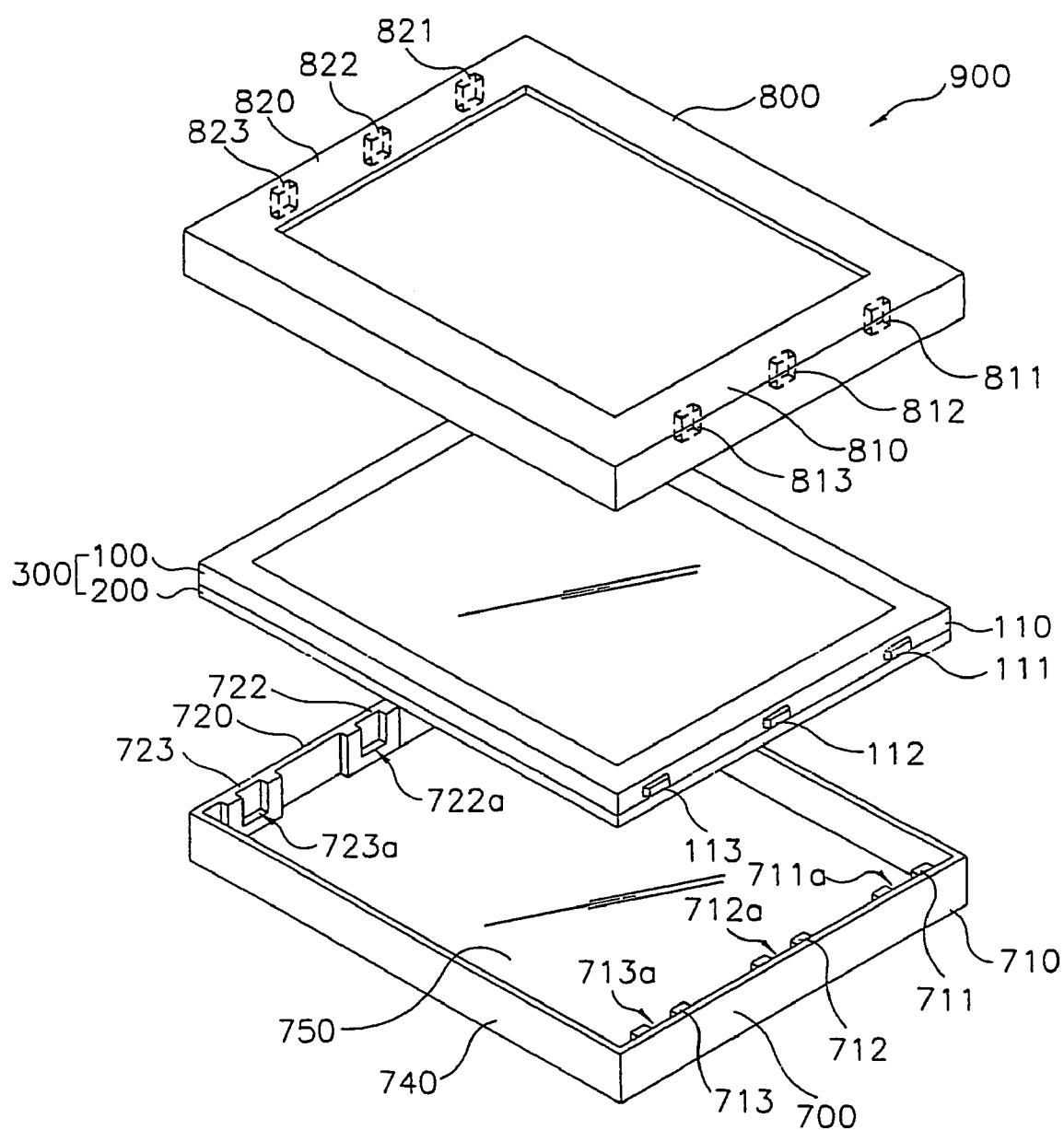
FIG. 19 is an exploded perspective view showing a liquid crystal display apparatus according to another embodiment of the present invention.
Figure 20:
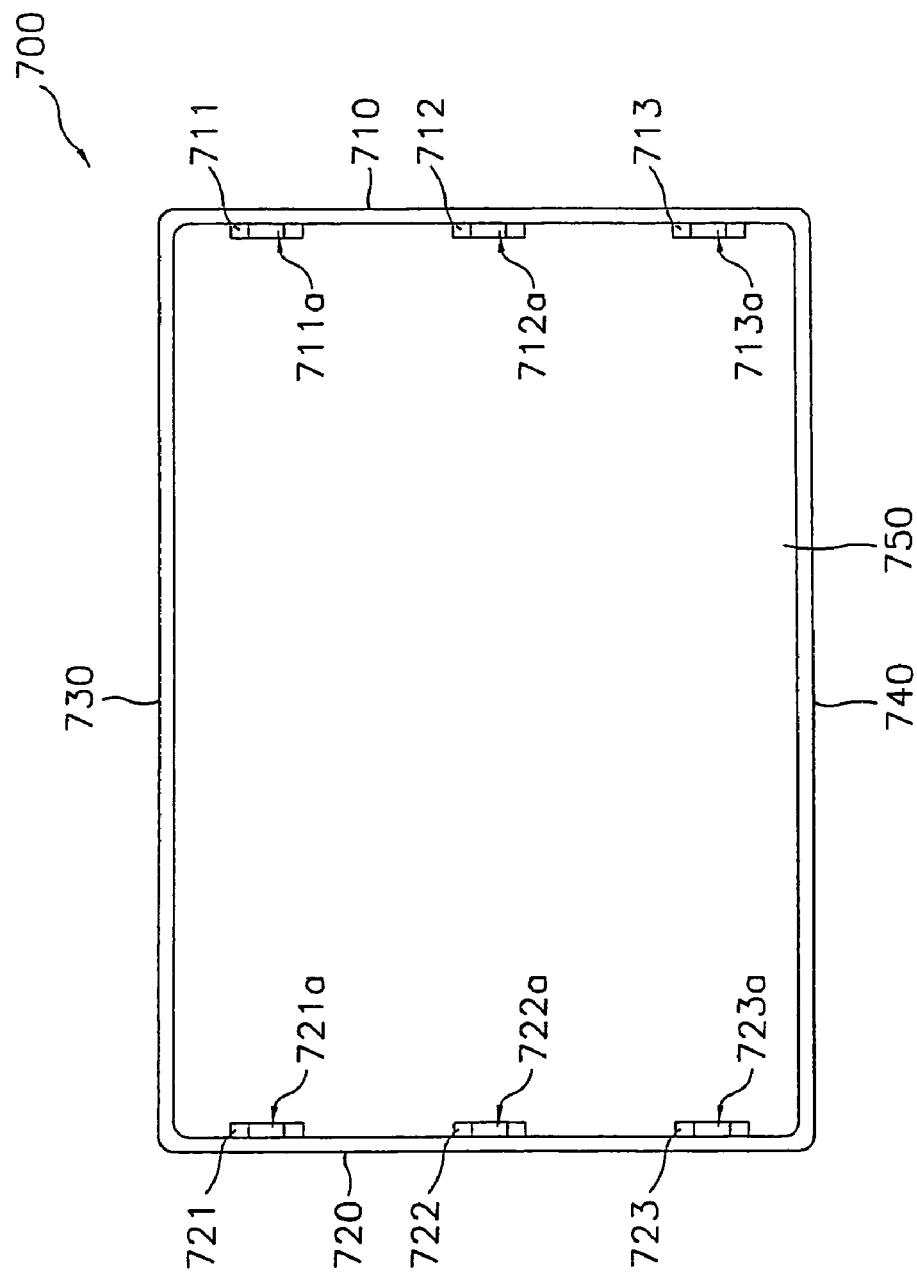
FIG. 20 is a plan view showing a structure of a rear case shown in FIG. 19.
Figure 21:
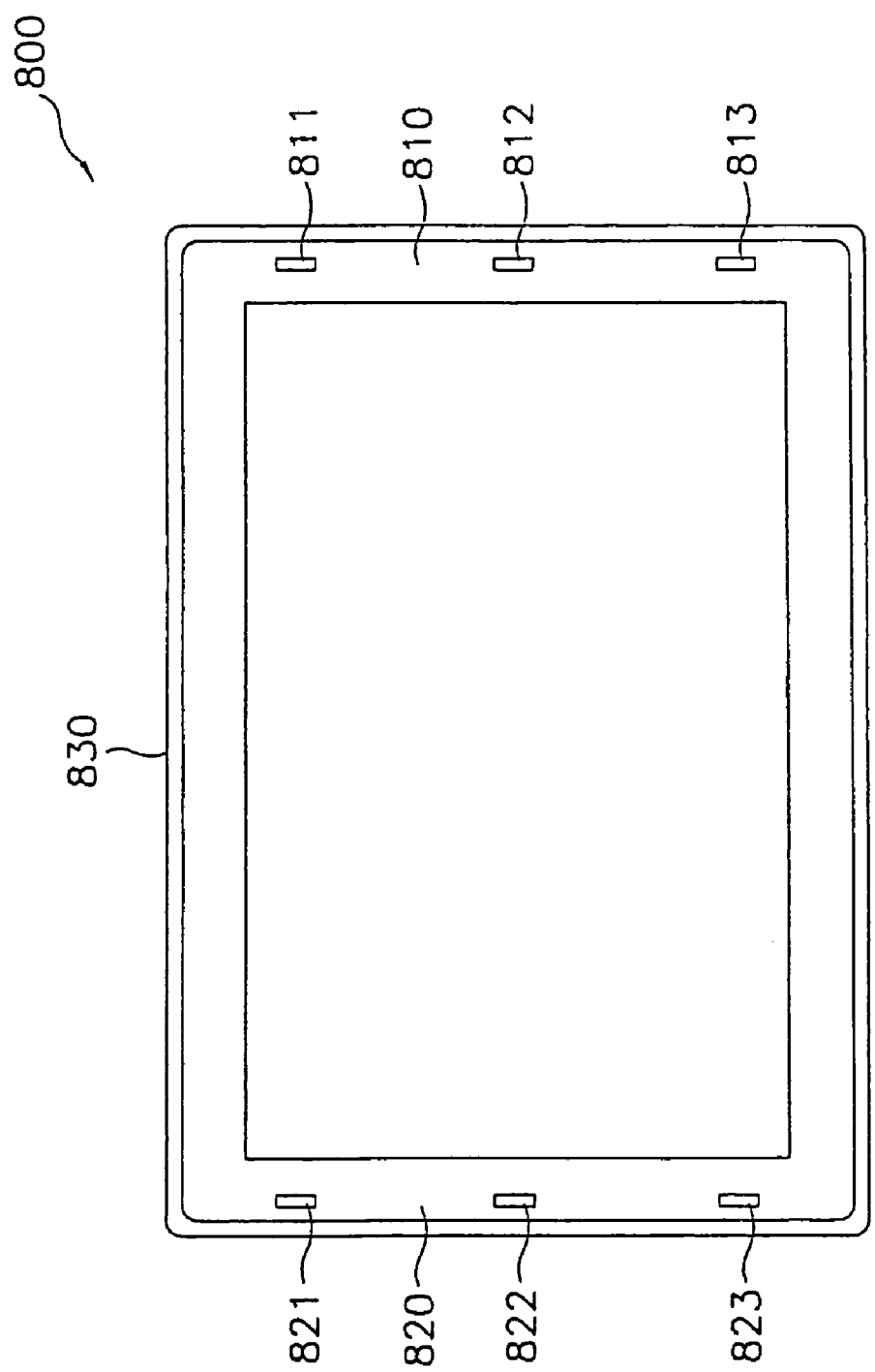
FIG. 21 is a plan view showing a structure of a front case shown in FIG. 19.

FIG. 19 is an exploded perspective view showing a liquid crystal display apparatus according to another embodiment of the present invention, FIG. 20 is a plan view showing a structure of a rear case shown in FIG. 19, and FIG. 21 is a plan view showing a structure of a front case shown in FIG. 19. In FIG. 19, elements identical to those in FIG. 2 have the same reference numerals and the description concerning their functions will be omitted.

Referring to FIG. 19, a liquid crystal display apparatus 900 has a liquid crystal display module 300 for displaying an image, and cases for receiving the liquid crystal display module 300. Those cases include a front case 800 and a rear case 700.

When a back light assembly 360 and a display unit 310 are successively received in a mold frame 200, a top chassis 100 is mounted on the display unit 310. The top chassis 100 covers an upper portion of the display unit 310 besides an effective display area of the display unit 310, and insides of four side walls of the top chassis 100 are combined with outsides of side walls of the mold frame 200, respectively.

First to third protuberances 111, 112 and 113 are formed on a first side wall 110 of the top chassis 100, and fourth to sixth protuberances 121, 122 and 123 are formed on a second side wall 120 facing the first side wall 110 of the top chassis 100.

As shown in FIG. 20, the rear case 700 includes a bottom face 750 and ninth to twelfth side walls 710, 720, 730 and 740. Ninth to eleventh protruding portions 711, 712 and 713 having a predetermined height are formed on the ninth side wall 710 of the rear case 700 combined with the first side wall 110 of the top chassis 100. Also, twelfth to fourteenth protruding portions 721, 722 and 723 having a predetermined height are formed on the tenth side wall 720 of the rear case 700 combined with the second side wall 120 of the top chassis 100.

Fifteenth to seventeenth fixing grooves 711a, 712a and 713a are respectively formed on the ninth to eleventh protruding portions 711, 712 and 713 from an upper end of the ninth side wall 710 toward the bottom face 750 of the rear case 700. Eighteenth to twentieth fixing grooves 721a, 722a and 723a are respectively formed on the twelfth to fourteenth protruding portions 721, 722 and 723 from an upper end of the tenth side wall 720 of the rear case 700 toward the bottom face 750 of the rear case 700.

Referring to FIG. 21, the front case 800 is combined with the rear case 700 after the liquid crystal display module 300 is received in the rear case 700. Seventeenth to nineteenth protuberances 811, 812 and 813 having a predetermined height are formed on a fifth upper face 810 of the front case 800 adjacent to the ninth side wall 710 of the rear case 700. The seventeenth to nineteenth protuberances 811, 812 and 813 are formed toward the bottom face 750 of the rear case 700. In addition, twentieth to twenty-second protuberances 821, 822 and 823 having a predetermined height toward the bottom face 750 of the rear case 700 are formed on a sixth upper face 820 of the front case 800 adjacent to the tenth side wall 720 of the rear case 700. The seventeenth to twenty-second protuberances 811, 812, 813, 821, 822 and 823 are formed spaced from side walls of the front case 800 by a distance identical to each of the thickness of the ninth and tenth side walls 710 and 720.

Figure 22:
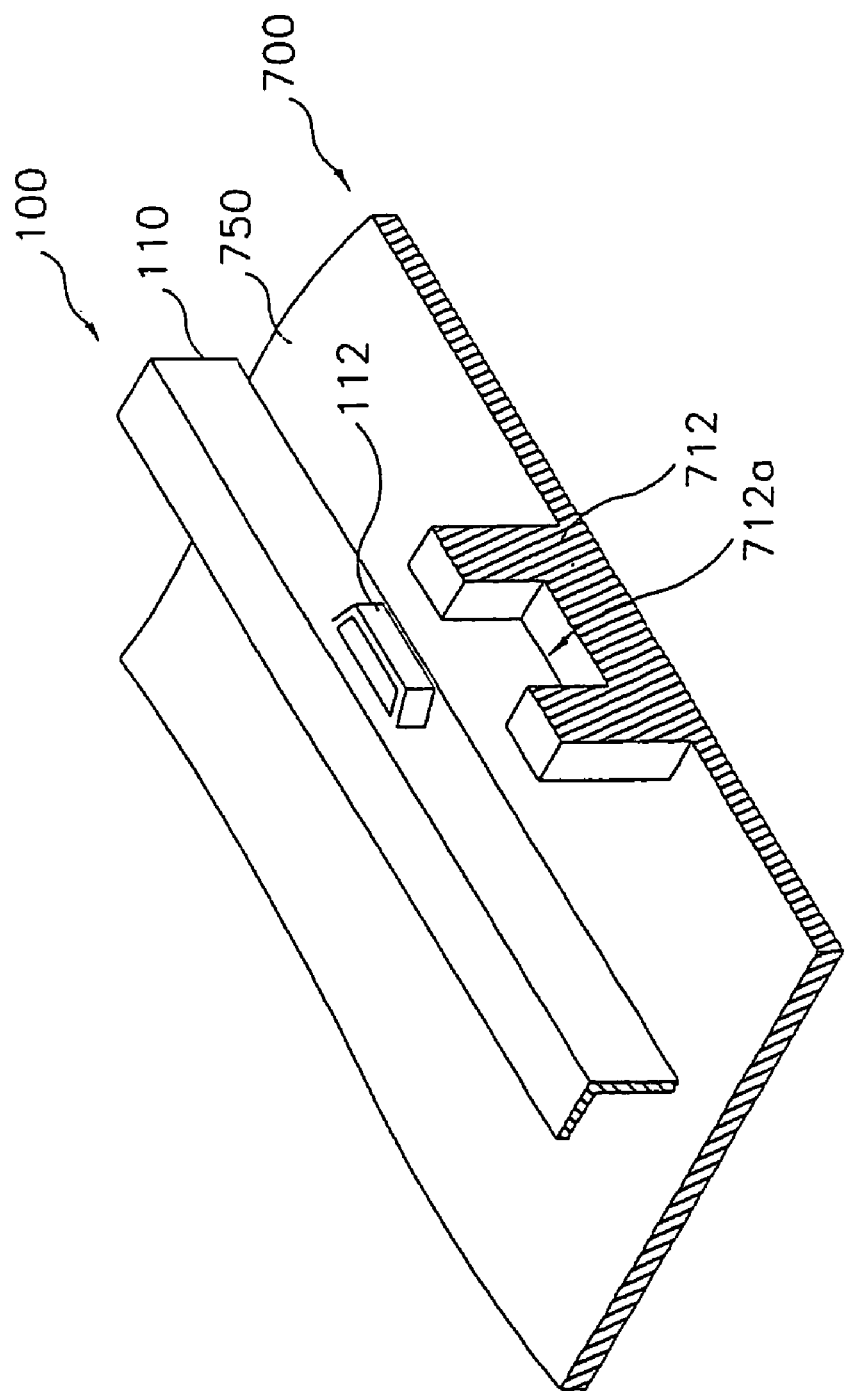
FIGS. 22 and 23 are partially cut perspective views illustrating a method for combining the top chassis with the rear case shown in FIG. 19.
Figure 23:
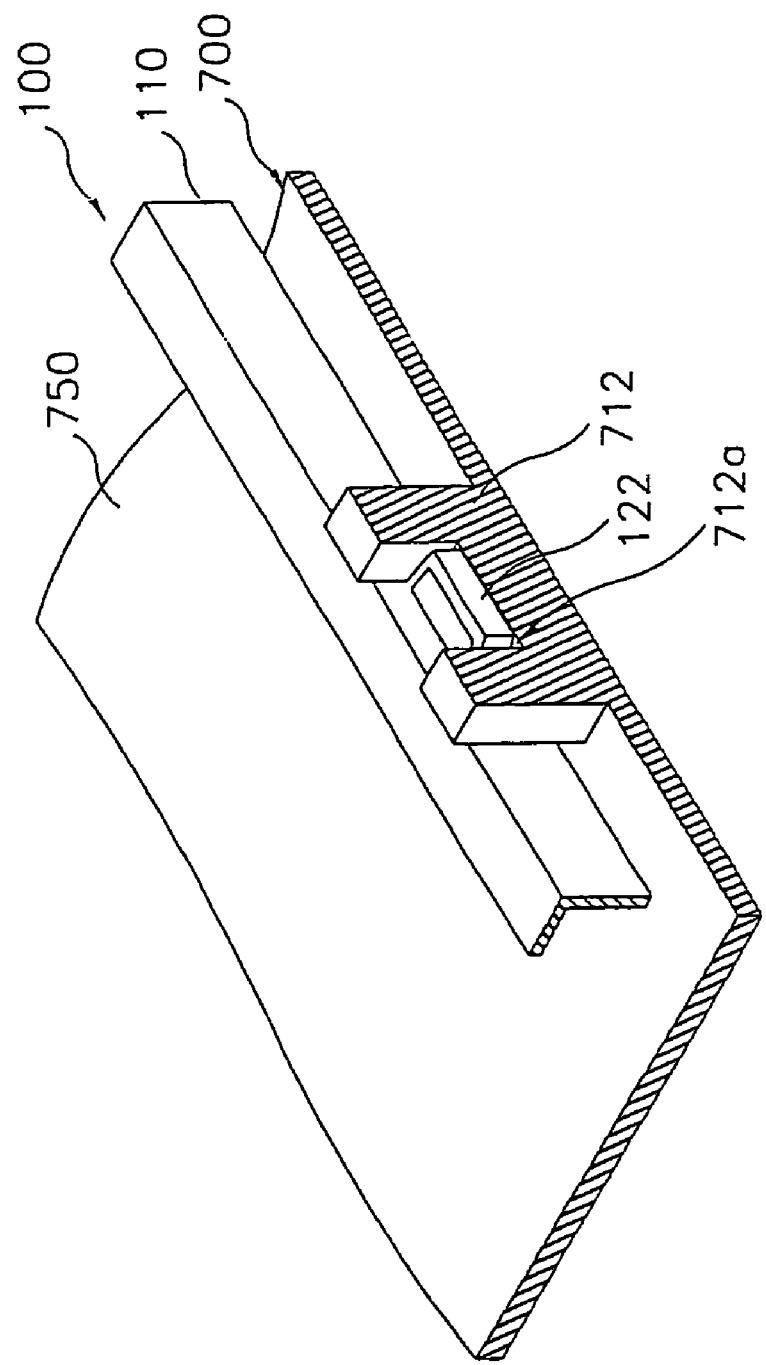
Figure 24:
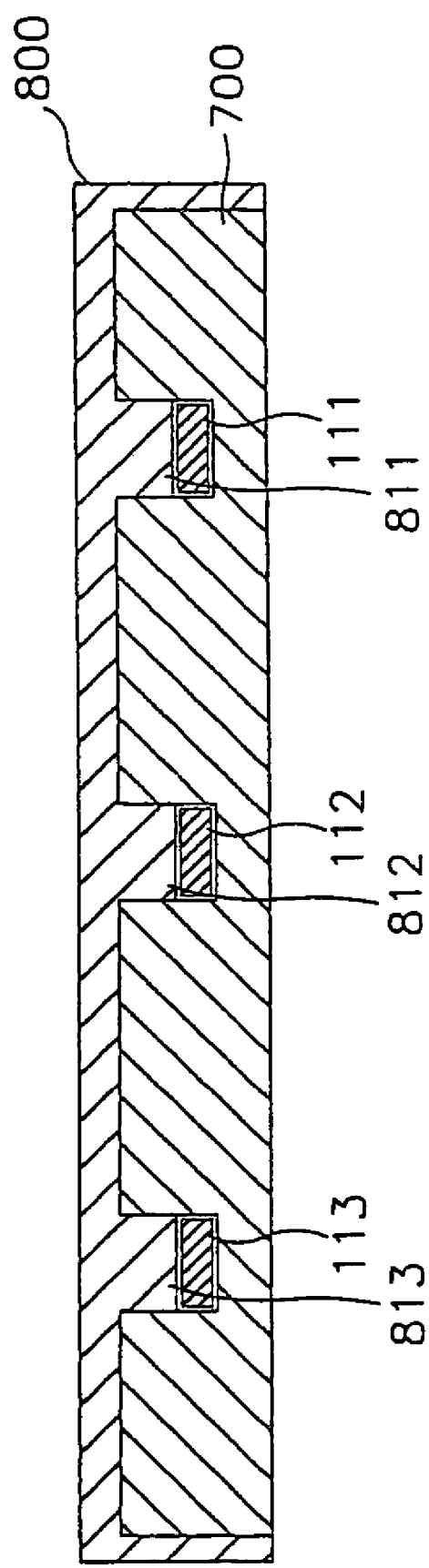
FIG. 24 is a cross-sectional view showing an assembled structure of the top chassis, the rear case and the front case.

FIGS. 22 and 23 are partially cut perspective views illustrating a method for combining the top chassis with the rear case in FIG. 19, and FIG. 24 is a cross-sectional view showing an assembled structure of the top chassis, the rear case and the front case shown in FIG. 19.

Referring to FIGS. 22 and 23, the tenth protruding portion 712 formed on the ninth side wall 710 of the rear case 700 includes the sixteenth fixing groove 712a formed from an upper end of the ninth side wall 710 toward the bottom face 750 of the rear case 700.

A second protuberance 112 having a predetermined height toward the ninth side wall 710 of the rear case 700 is formed on the first side wall 110 of the top chassis 100 corresponding to the ninth side wall 710 of the rear case 700. The first side wall 110 of the top chassis 100 is partially cut in parallel with the bottom face 750 of the rear case 700 and toward the ninth side wall 710 of the rear case 700, and the second protuberance 112 is protruded toward a cut portion of the first side wall 110 of the top chassis 100. When the top chassis 100 is received in the rear case 700, the second protuberance 112 of the top chassis 100 is inserted into the sixteenth fixing groove 712a of the rear case 700.

Referring to FIG. 24, when the liquid crystal display module 300 is received in the rear case 700, the front case 800 is mounted thereon. The seventeenth to nineteenth protuberances 811, 812 and 813 protruded from the fifth upper face 810 of the front case 800 are inserted into the fifteenth to seventeenth fixing grooves 711a, 712a and 713a, respectively. That is, each of the fifteenth to seventeenth fixing grooves 711a, 712a and 713a has a depth identical to a sum of heights of the first to third protuberances 111, 112 and 113 of the top chassis 100 and heights of the seventeenth to nineteenth protuberances 811, 812 and 813 of the front case 800. The seventeenth to nineteenth protuberances 811, 812 and 813 of the front case 800 pressurize the first to third protuberances 111, 112 and 113, thereby preventing the liquid crystal display module 300 from being deviated from the rear case 700.

Hereinafter, it will be described an assembled structure of a liquid crystal display module and cases of a liquid crystal display apparatus according to still another embodiment of the present invention with reference to FIGS. 25 to 33.

Figure 25:
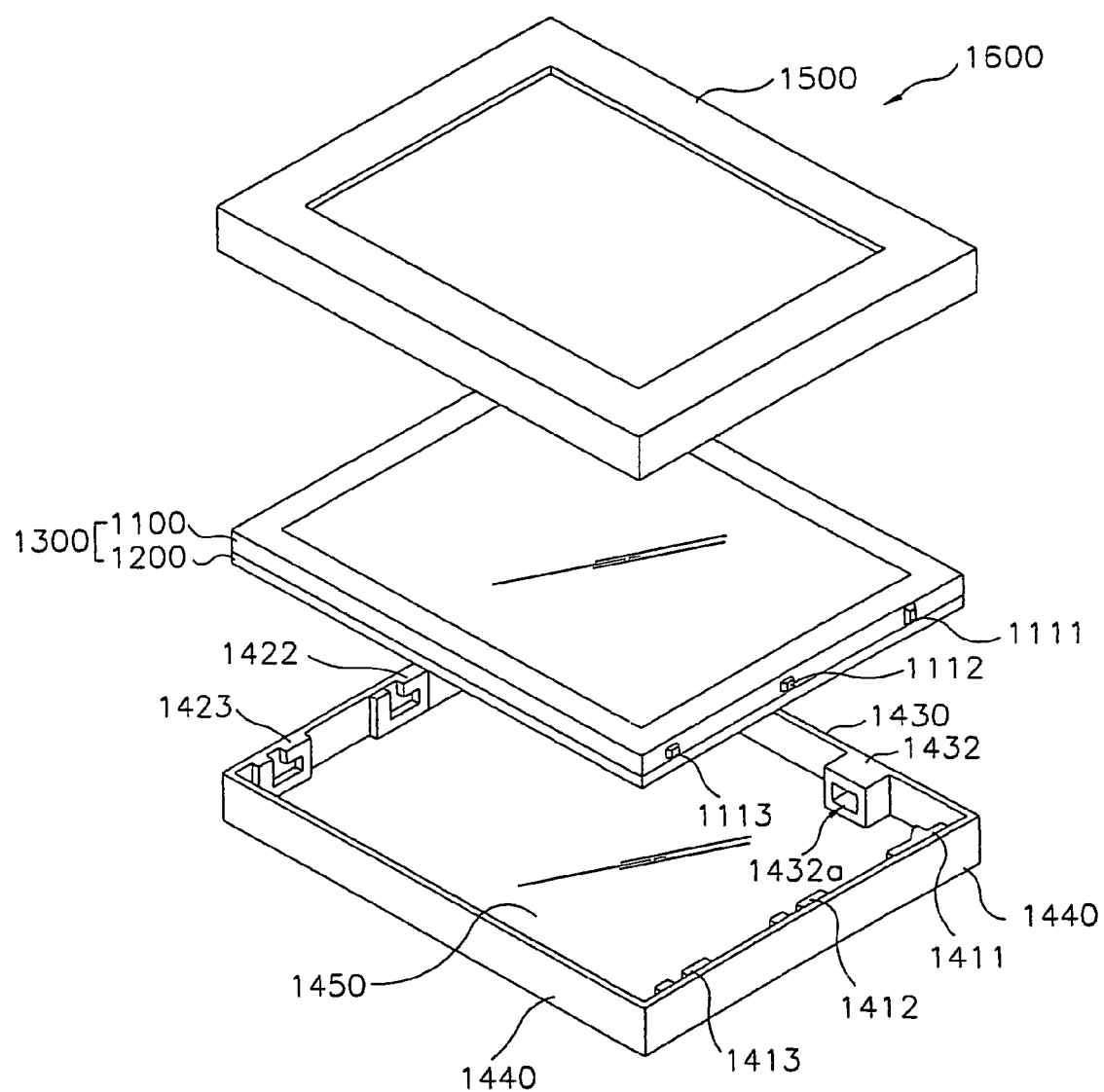
FIG. 25 is an exploded perspective view showing a liquid crystal display device according to still another embodiment of the present invention.
Figure 26:
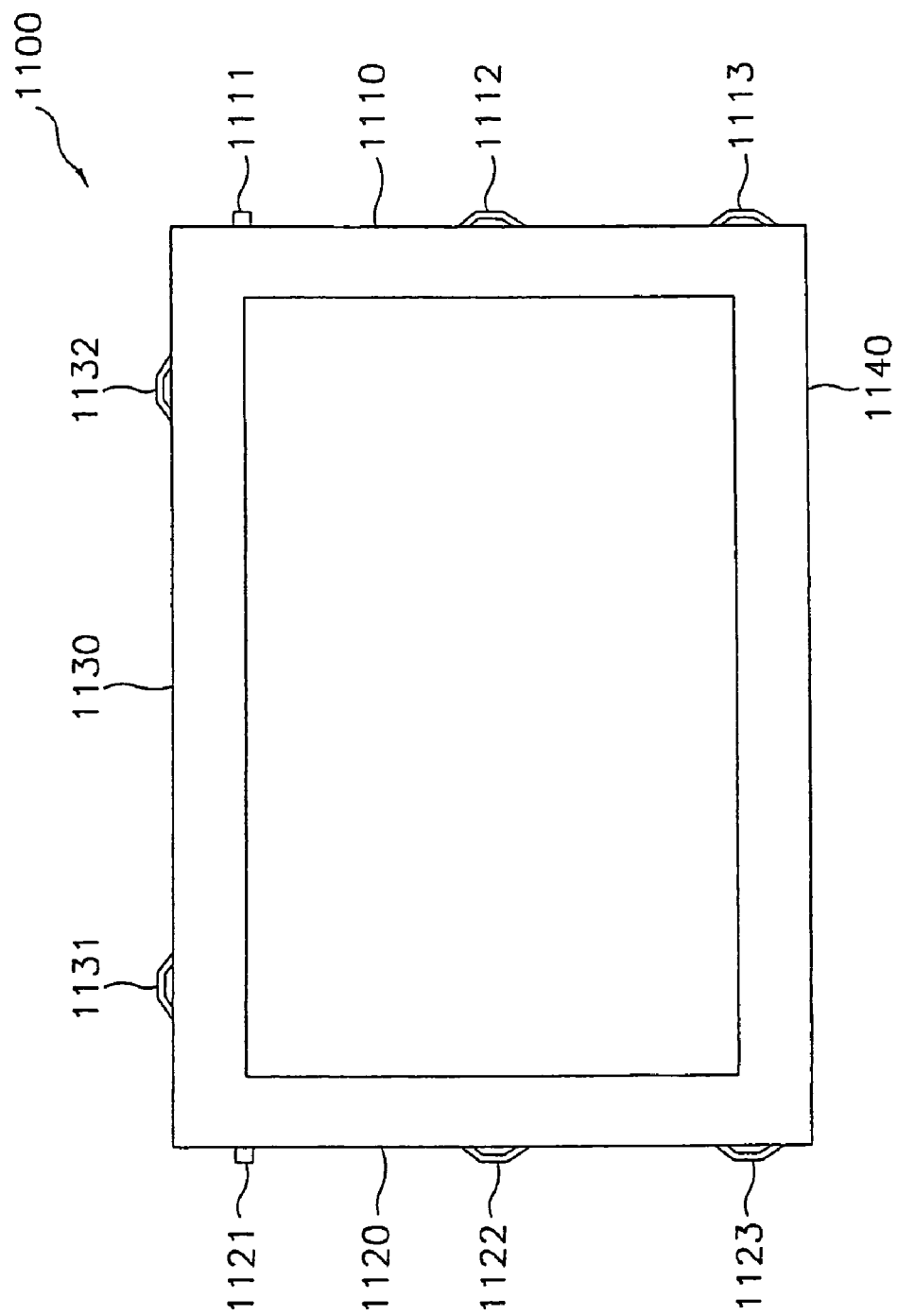
FIG. 26 is a plan view showing a structure of a top chassis shown in FIG. 25.
Figure 27:
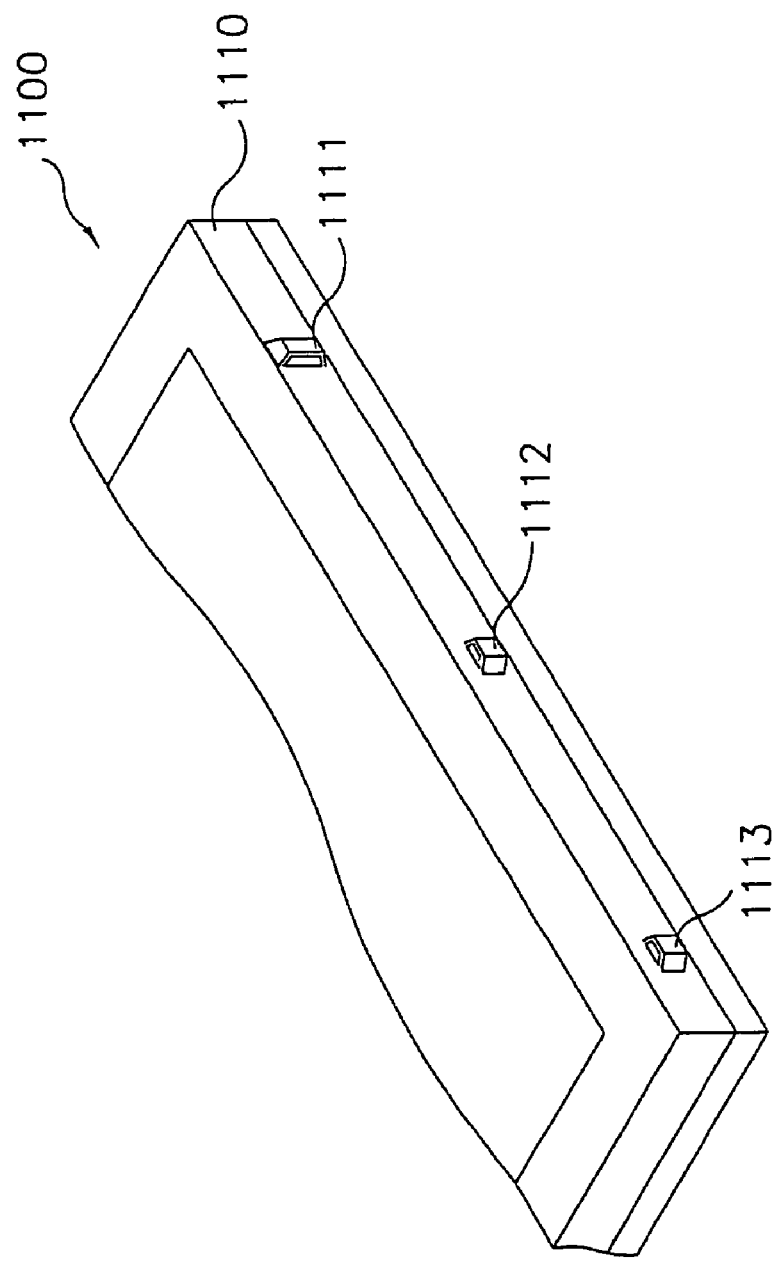
FIG. 27 is a partial perspective view showing a structure of the top chassis shown in FIG. 25.
Figure 28:
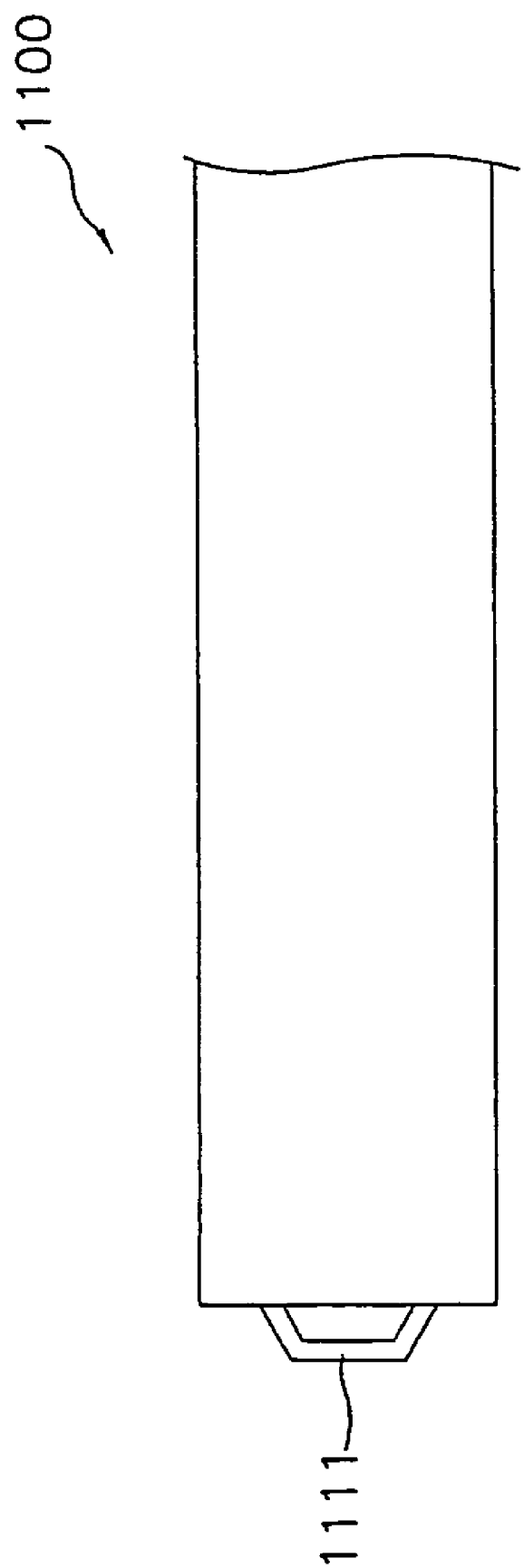
FIGS. 28 and 29 are side views illustrating the top chassis shown in FIG. 25.
Figure 29:
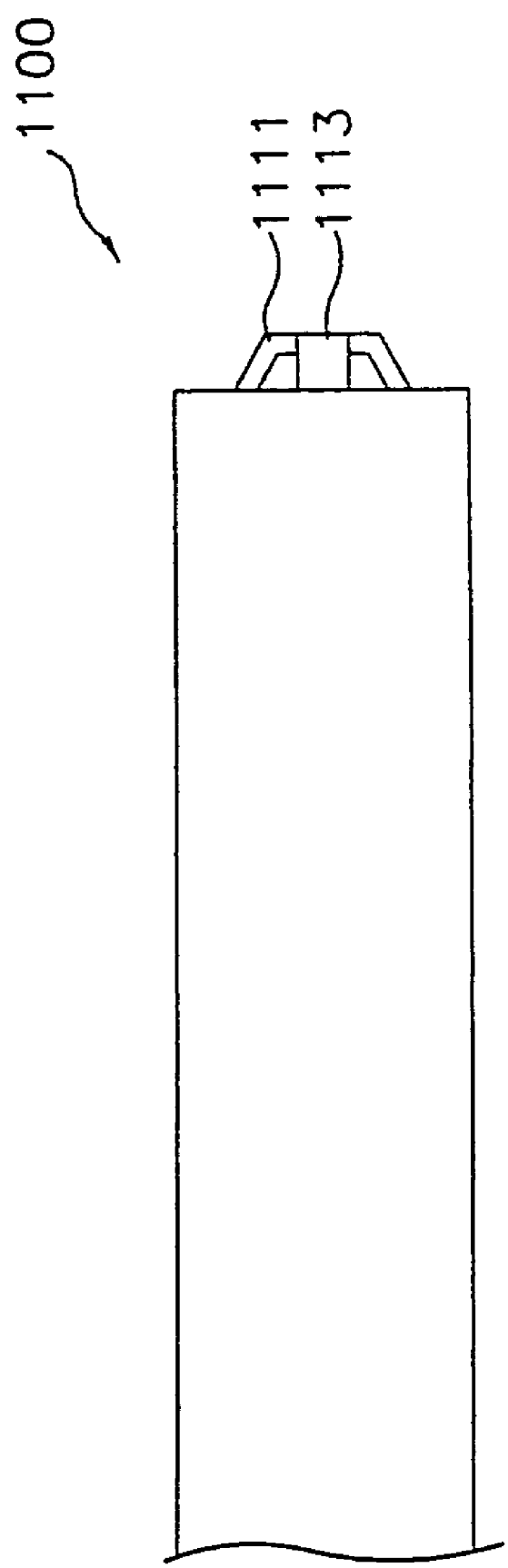

FIG. 25 is an exploded perspective view showing a liquid crystal display apparatus according to still another embodiment of the present invention, FIG. 26 is a plan view showing a structure of a top chassis shown in FIG. 25, FIG. 27 is a partial perspective view showing a structure of the top chassis shown in FIG. 25, and FIGS. 28 and 29 are side views illustrating the top chassis shown in FIG. 25.

Referring to FIG. 25, a liquid crystal display apparatus 1600 has a liquid crystal display module 1300 for displaying an image, and cases for receiving the liquid crystal display module 1300. Those cases include a front case 1500 and a rear case 1400.

When a back light assembly and a display unit are successively received in a mold frame 1200, a top chassis 1100 is mounted on the display unit. The top chassis 1100 has a rectangular cramp shape. The top chassis 1100 covers an upper portion of the display unit except for an effective display area of the display unit, and insides of four side walls of the top chassis 1100 are combined with outsides of side walls of the mold frame 1200, respectively.

As shown in FIGS. 26 to 29, the top chassis 1100 has thirteenth to sixteenth side walls 1110, 1120, 1130 and 1140. Twenty-third to twenty-fifth protuberances 1111, 1112 and 1113 each having a predetermined height are formed on the thirteenth side wall 1110 of the top chassis 1100, and twenty-sixth to twenty-eighth protuberances 1121, 1122 and 1123 each having a predetermined height are formed on the fourteenth side wall 1120 corresponding to the thirteenth side wall 1110. Also, twenty-ninth and thirtieth protuberances 1131 and 1132 each having a predetermined height are formed on the fifteenth side wall 1130 of the top chassis 1100. The twenty-third to thirtieth protuberances 1111, 1112, 1113, 1121, 1122, 1123, 1131 and 1132 are formed by cutting predetermined portions of the thirteenth to fifteenth side walls 1110, 1120 and 1130 of the top chassis 1100. The twenty-fourth, twenty-fifth, twenty-seventh and twenty-eighth protuberances 1112, 1113, 1122 and 1123 are extended parallel with a bottom face 1450 of the rear case 1400, with various shapes. The twenty-fourth, twenty-fifth, twenty-seventh and twenty-eighth protuberances 1112, 1113, 1122 and 1123 respectively have semicircular shapes, trapezoidal shapes or rectangular shapes when observed from the front and rear cases 1500 and 1400. Among them, trapezoidal shapes are preferable. In the meantime, the twenty-third and twenty-sixth protuberances 1111 and 1121 are extended perpendicular to the bottom face 1450 of the rear case 1400. The twenty-third and twenty-sixth protuberances 1111 and 1121 have trapezoidal shapes when observed from the nineteenth side wall 1430 of the rear case 1400.

Figure 30:
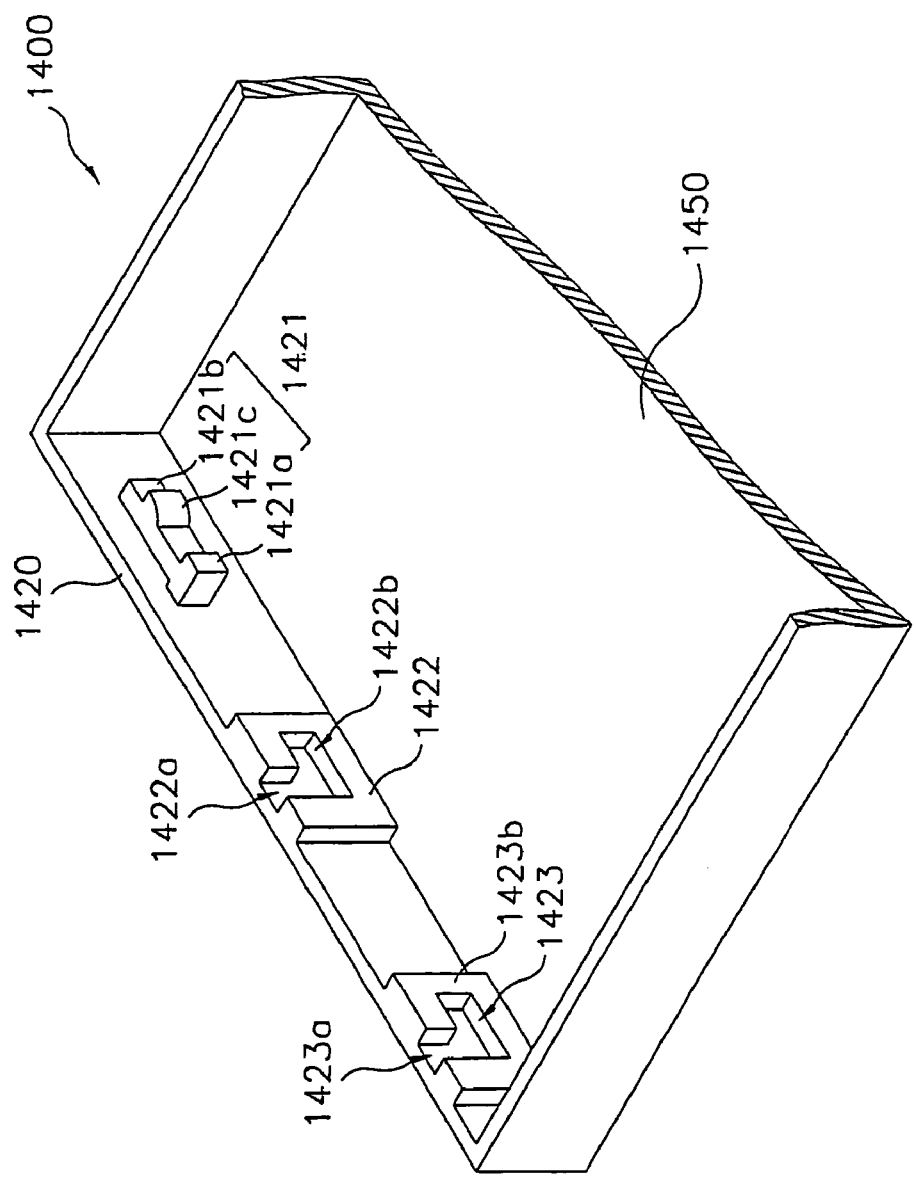
FIG. 30 is a partially cut perspective view showing the rear case shown in FIG. 25.

FIG. 30 is a partially cut perspective view showing the rear case shown in FIG. 25.

Referring to FIGS. 25 and 30, the rear case 1400 has seventeenth to twentieth side walls 1410, 1420, 1430 and 1440, and the bottom face 1450 enclosed by the seventeenth to twentieth side walls 1410, 1420, 1430 and 1440. An upper face of the rear case 1400 corresponding to the bottom face 1450 is opened. Fifteenth and sixteenth protruding portions 1412 and 1413 each having a predetermined height are formed on the seventeenth side wall 1410 of the rear case 1400 combined with the thirteenth side wall 1110 of the top chassis 1100. Seventeenth and eighteenth protruding portions 1422 and 1423 each having a predetermined height are formed on the eighteenth side wall 1420 of the rear case 1400 combined with the fourteenth side wall 1120 of the top chassis 1100.

Twenty-first to twenty-fourth fixing grooves 1412a, 1413a, 1422a and 1423a are formed on the fifteenth to eighteenth protruding portions 1412, 1413, 1422 and 1423. The twenty-first to twenty-fourth fixing grooves 1412a, 1413a, 1422a and 1423a are formed from upper ends of the seventeenth and eighteenth side walls 1410 and 1420 of the rear case 1400 toward the bottom face 1450 of the rear case 1400. Also, twenty-fifth to twenty-eighth fixing grooves 1412b, 1413b, 1422b and 1423b are formed on the fifteenth to eighteenth protruding portions 1412,1413, 1422 and 1423. The twenty-fifth to twenty-eighth fixing grooves 1412b, 1413b, 1422b and 1423b are parallel with the bottom face 1450 of the rear case 1400 and protrude toward the nineteenth side wall 1430.

First and second fixing protuberances 1411 and 1421 are respectively formed on the seventeenth and eighteenth side walls 1410 and 1420 of the rear case 1400, and the first and second fixing protuberances 1411 and 1421 are combined with the twenty-third and twenty-sixth protuberances 1111 and 1121, respectively. The first and second fixing protuberances 1411 and 1421 respectively have supporting portions 1411a and 1421a, and bodies 1411b and 1421b. Supporting portions 1411a and 1421a protrude toward opposite side walls by a predetermined height, and bodies 1411b and 1421b are extended from ends of supporting portions 1411a and 1421a toward the nineteenth side wall 1430. Suspending portions 1411c and 1421c are formed on sides of the bodies 1411b and 1421b, and the suspending portions 1411c and 1421c are protruded from the bodies 1411b and 1421b. The suspending portions 1411c and 1421c are engaged with the twenty-third and the twenty-sixth protuberances 1111 and 1121.

The bodies 1411b and 1421b are separated from the seventeenth and the eighteenth side walls 1410 and 1420 by a predetermined interval, and the suspending portions 1411c and 1421c have a slope shape that is gradually wider toward the nineteenth side wall 1430 of the rear case 1400.

Twenty-ninth and thirtieth fixing grooves 1431a and 1432a are formed on the nineteenth and twentieth protruding portions 1431 and 1432 which are formed on the nineteenth side wall 1430 of the rear case 1400 and protrude toward the twentieth side wall 1440 by a predetermined height. The twenty-ninth and thirtieth fixing grooves 1431a and 1432a are combined with the twenty-ninth and thirtieth protuberances 1131 and 1132 formed on the fifteenth side wall 1130 of the top chassis 1100, respectively.

Figure 31:
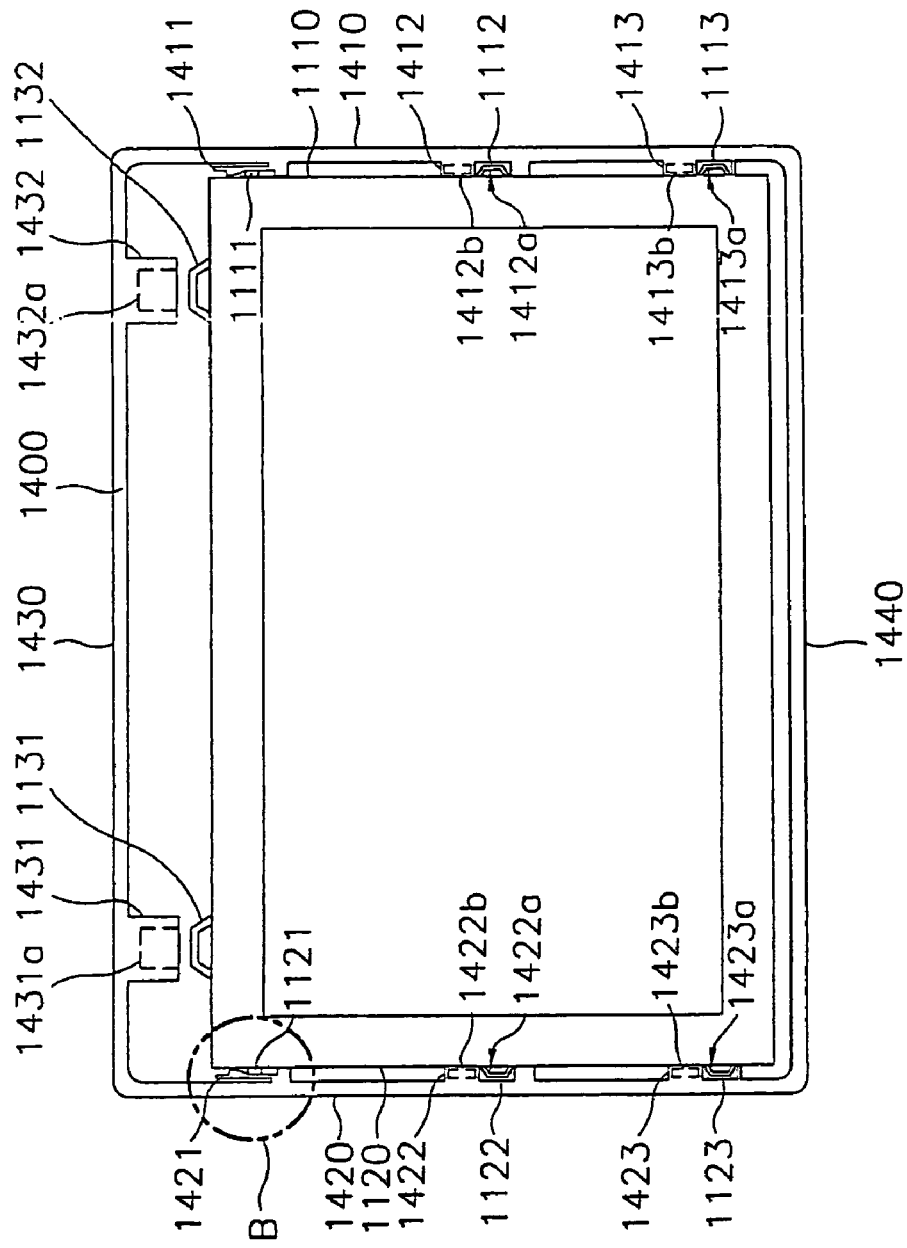
FIG. 31 is a plan view showing the top chassis and the rear case shown in FIG. 25 before the top chassis combines with the rear case.
Figure 32:
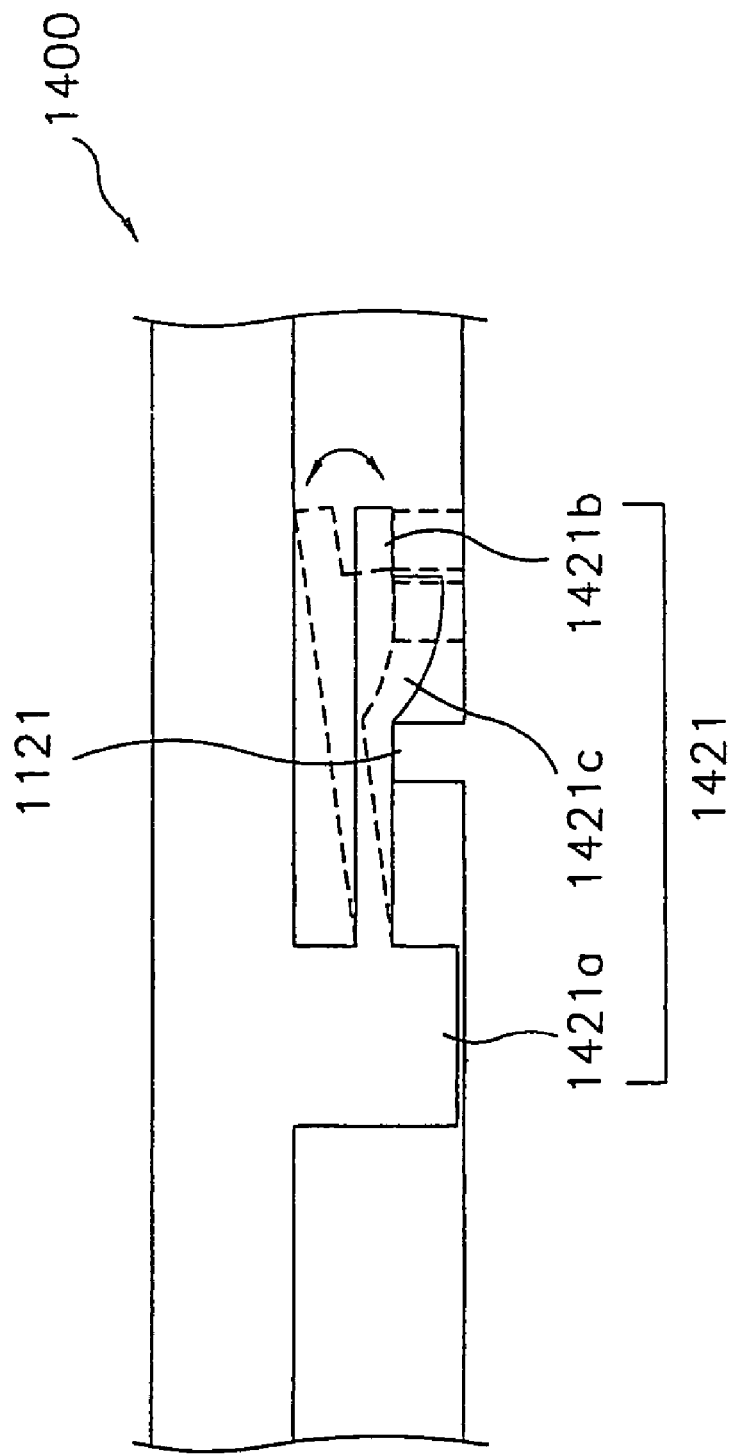
FIG. 32 is an enlarged plan view showing 'B' shown in FIG. 31.
Figure 33:
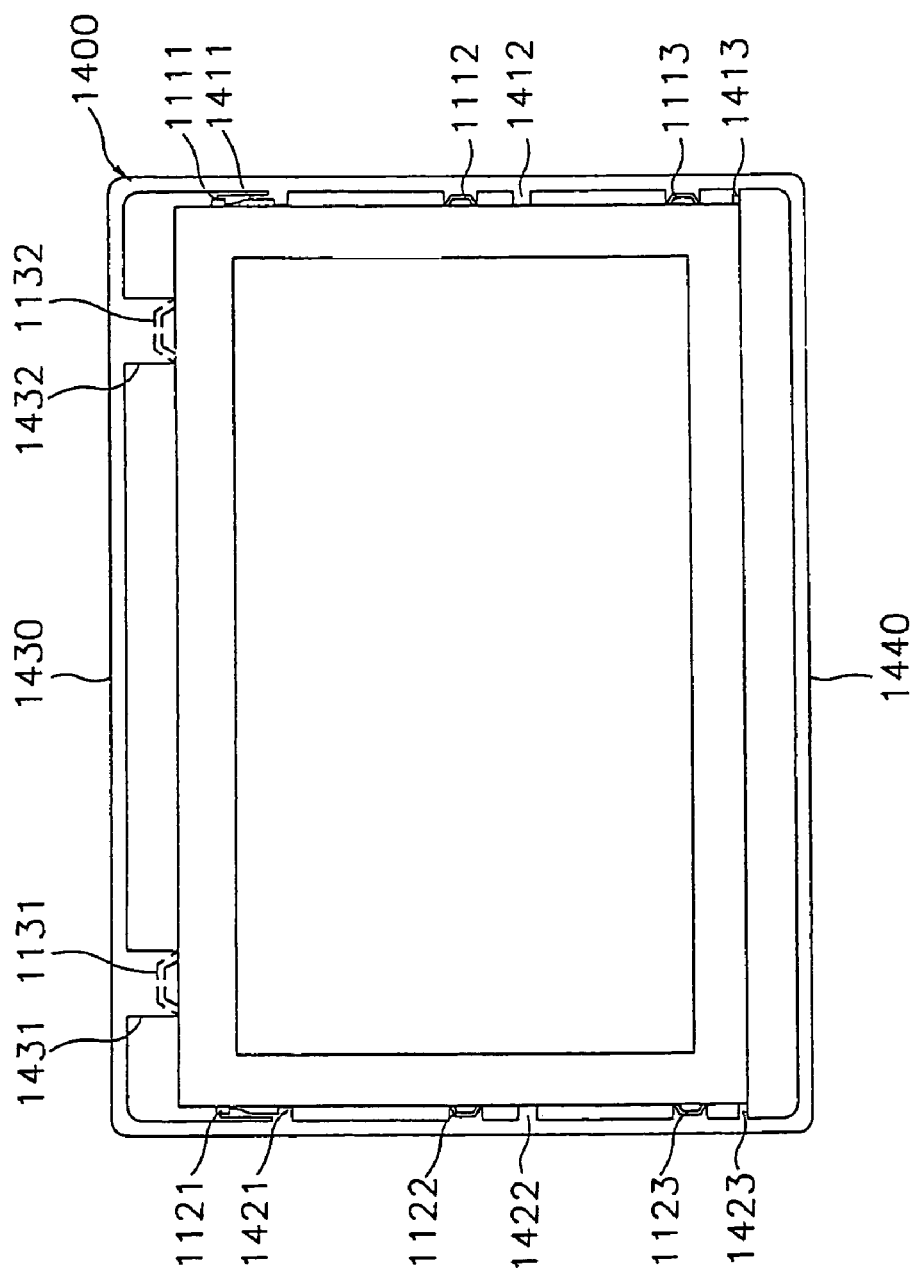
FIG. 33 is a plan view illustrating an assembled structure of the top chassis and the rear case shown in FIG. 25.

FIG. 31 is a plan view showing the top chassis and the rear case shown in FIG. 25 before the top chassis is completely combined with the rear case, FIG. 32 is an enlarged plan view showing 'B' shown in FIG. 31, and FIG. 33 is a plan view illustrating an assembled structure of the top chassis and the rear case shown in FIG. 25.

Referring to FIG. 31, when the liquid crystal display module 1300 is received in the rear case 1400, the twenty-fourth and twenty-fifth protuberances 1112 and 1113 formed on the thirteenth side wall 1110 of the top chassis 1100 are respectively combined with the twenty-first and twenty-second fixing grooves 1412a and 1413a formed on the seventeenth side wall 1410 of the rear case 1400. Also, the twenty-seventh and twenty-eighth protuberances 1122 and 1123 of the top chassis 1100 are respectively combined with the twenty-third and twenty-fourth fixing grooves 1422a and 1423a of the rear case 1400.

The twenty-third and twenty-sixth protuberances 1111 and 1121 make contact with portions of bodies 1411a and 1421b positioned between the supporting portions 1411a and 1421a and the suspending portions 1411c and 1421c of the first and second fixing protuberances 1411 and 1421.

When the liquid crystal display module 1300 moves toward the nineteenth side wall 1430 of the rear case 1400, the twenty-fourth and twenty-fifth protuberances 1112 and 1113 formed on the thirteenth side wall 1110 of the top chassis 1100 are respectively combined with the twenty-fifth and twenty-sixth fixing grooves 1412b and 1413b formed on the seventeenth side wall 1410 of the rear case 1400. In addition, the twenty-seventh and twenty-eighth protuberances 1122 and 1123 formed on the fourteenth side wall 1120 of the top chassis 1100 are respectively combined with the twenty-seventh and twenty-eighth fixing grooves 1422a and 1423b formed on the eighteenth side wall 1420 of the rear case 1400.

Referring to FIG. 32, the twenty-third and twenty-sixth protuberances 1111 and 1121 are inclined to the seventeenth and eighteenth side walls 1410 and 1420 of the rear case 1400 and move toward the nineteenth side wall 1430 of the rear case 1400 through the suspending portions 1411c and 1421c having slope shapes as those bodies 1411b and 1421b are inclined toward the seventeenth and eighteenth side walls 1410 and 1420 of the rear case by elastic forces of bodies 1411b and 1421b.

As shown in FIG. 33, the twenty-third and twenty-sixth protuberances 1111 and 1121 are engaged with bodies 1411b and 1421b at ends of the suspending portions 1411c and 1421c, and the bodies 1411b and 1421b support the twenty-third and the twenty-sixth protuberances 1111 and 1121 by restoring force of the bodies 1411b and 1421b. The twenty-third and twenty-sixth protuberances 1111 and 1121 are hung by the suspending portions 1411c and 1421c, thereby preventing the liquid crystal display module 300 from being moved toward the twentieth side wall 1440 corresponding to the nineteenth side wall 1430 of the rear case 1400.

Also, the twenty-ninth and thirtieth protuberances 1131 and 1132 formed on the fifteenth side wall 1130 of the top chassis 1100 are respectively combined with the twenty-ninth and thirtieth fixing grooves 1431a and 1432a formed on the nineteenth side wall 1430 of the rear case 1400 when the liquid crystal display module 1300 moves toward the nineteenth side wall 1430 of the rear case 1400. Therefore, the liquid crystal module 1300 is not separated from the rear case 1400 through the open upper face of the rear case 1400.

An isolation space A is formed between the liquid crystal display module 1300 and the twentieth side wall 1440 of the rear case 1400 as shown in FIG. 33. Also, at least one protuberance inserted into the isolation space A may be formed on an upper face of the front case 1500 corresponding to the twentieth side wall 1440 of the rear case 1400 so as to more effectively prevent the liquid crystal display module 1300 from being moved toward the isolation space A.

As described above, according to the liquid crystal display apparatus of the present invention, protuberances are formed on the top chassis, and fixing portions to be combined with the protuberances are formed on the rear case facing the top chassis. Also, fixing protuberances are formed on predetermined portions of the front case, and the fixing protuberances are inserted into between the liquid crystal display module and the rear case.

Therefore, the liquid crystal display module is fixed in the rear case as the protuberances formed on the top chassis are combined with the fixing portions formed on the rear case, and also the liquid crystal display module is tightly fixed therein by the fixing protuberances formed on the front case.

In addition, the combining strength between the liquid crystal module and the cases can increase, and productivity of the liquid crystal display apparatus can be improved by reducing the number of parts demanded in order to assemble the liquid crystal module and cases.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A liquid crystal display apparatus comprising:
   a liquid crystal display module having a first protruding portion and a second protruding portion; and
   a rear case for receiving said liquid crystal display module, said rear case having a fixing groove for guiding and receiving said first protruding portion and a fixing protuberance directly combined with said second protruding portion, for fixing said liquid crystal display module to said rear case.

2. The liquid crystal display apparatus of claim 1, wherein said liquid crystal display module comprises:
   a back light assembly for generating a light;
   a display unit for receiving the light to display an image;
   a mold frame for receiving said back light assembly and said display unit; and
   a top chassis combined with said mold frame, for fixing said display unit and said back light assembly to said mold frame, said top chassis having opposing first and second side walls wherein each of said first and second side walls comprise first and second protruding portions.

3. The liquid crystal display apparatus of claim 2, wherein said rear case comprises third and fourth side walls corresponding to said first and second side walls of said top chassis, and each of said third and fourth side walls comprises said fixing groove corresponding to said first protruding portion formed on said first and second sidewalls of said top chassis.

4. The liquid crystal display apparatus of claim 3, wherein said fixing groove comprises:
   a first fixing groove extended from upper faces of said third and fourth side walls of said rear case toward a bottom face of said rear case; and
   a second fixing groove extended from a lower portion of said first fixing groove toward a fifth side wall of said rear case disposed between said third and fourth side walls.

5. The liquid crystal display apparatus of claim 4, wherein said liquid crystal display module slides toward said second fixing groove of said rear case to be combined with said rear case when said first protruding portion of said top chassis is received in said first fixing groove of said rear case.

6. The liquid crystal display apparatus of claim 2, wherein said rear case comprises third and fourth side walls corresponding to said first and second side walls of said top chassis, and each of said third and fourth side walls comprises said fixing protuberance corresponding to said second protruding portion formed on said first and second side walls of said top chassis.

7. The liquid crystal display apparatus of claim 6, wherein said fixing protuberance comprises:
   a supporting portion extending a predetermined height toward an opposing side wall;
   a body extended from an end of said supporting portion toward a fifth side wall disposed between said third and fourth side walls and separated by a predetermined interval from said third side wall or said fourth side wall; and
   a suspending portion extending from said body and engaging with said second protruding portion of said top chassis, preventing said liquid crystal display module from being moved.

8. The liquid crystal display apparatus of claim 7, wherein said suspending portion has a cross-section which gradually widens toward said fifth side wall of said rear case.

9. The liquid crystal display apparatus of claim 1, further comprising a front case combined with said rear case, said front case having first and second upper faces corresponding to third and fourth side walls of said rear case wherein each of said first and second upper faces comprises a third protruding portion having a predetermined height toward a bottom face of said rear case.

10. The liquid crystal display apparatus of claim 9, wherein said third protruding portion of said front case is received in said fixing groove, and a bottom face of said third protruding portion directly contacts a bottom face of said fixing groove of said rear case.

11. The liquid crystal display apparatus of claim 1, wherein said first protruding portion includes a plurality of protruding portions, and said fixing groove includes a plurality of fixing grooves receiving the plurality of protruding portions, respectively.

* * * * *